(12) United States Patent
Hillam

(10) Patent No.: US 11,156,327 B2
(45) Date of Patent: Oct. 26, 2021

(54) ALL-PURPOSE MOUNTING SYSTEM

(71) Applicant: Ryan Hillam, Fruitland, ID (US)

(72) Inventor: Ryan Hillam, Fruitland, ID (US)

( * ) Notice: Subject to any disclaimer, the term of this patent is extended or adjusted under 35 U.S.C. 154(b) by 50 days.

(21) Appl. No.: 16/363,944

(22) Filed: Mar. 25, 2019

(65) Prior Publication Data

US 2020/0309316 A1     Oct. 1, 2020

(51) Int. Cl.
| | |
|---|---|
| *F16M 13/02* | (2006.01) |
| *F16B 45/00* | (2006.01) |
| *F16B 1/00* | (2006.01) |
| *F21V 21/088* | (2006.01) |
| *F21V 21/36* | (2006.01) |
| *F21V 21/096* | (2006.01) |
| *F21W 121/00* | (2006.01) |

(52) U.S. Cl.
CPC ............. *F16M 13/022* (2013.01); *F16B 1/00* (2013.01); *F16B 45/00* (2013.01); *F21V 21/088* (2013.01); *F21V 21/096* (2013.01); *F21V 21/36* (2013.01); *F16B 2001/0035* (2013.01); *F21W 2121/004* (2013.01)

(58) Field of Classification Search
CPC combination set(s) only.
See application file for complete search history.

(56) References Cited

U.S. PATENT DOCUMENTS

| | | | |
|---|---|---|---|
| 6,217,192 B1* | 4/2001 | Stratton | F21V 19/0005 362/249.01 |
| 8,490,936 B2* | 7/2013 | Rinck | F21S 4/10 248/206.5 |
| 2002/0079412 A1* | 6/2002 | Pitlor | H02G 3/20 248/206.5 |
| 2009/0201685 A1* | 8/2009 | George | F21V 21/096 362/398 |
| 2011/0006177 A1* | 1/2011 | Wakura | G09F 7/18 248/206.5 |
| 2014/0263908 A1* | 9/2014 | Franklin | H01R 13/6205 248/309.4 |

* cited by examiner

*Primary Examiner* — Monica E Millner
(74) *Attorney, Agent, or Firm* — S. Brandon Owen

(57) ABSTRACT

The present disclosure relates to a mounting system and a method for using the mounting system. Features and implementations include: (1) clip assemblies fastened to an object, the clip assemblies having two magnetic connection members; (2) anchor magnets affixed to a building, wall, or other structure; and (3) a mounting head with a mounting-head magnet, the mounting head being attached to a pole and used to connect the clip assemblies to the anchor magnets without the use of a ladder.

10 Claims, 36 Drawing Sheets

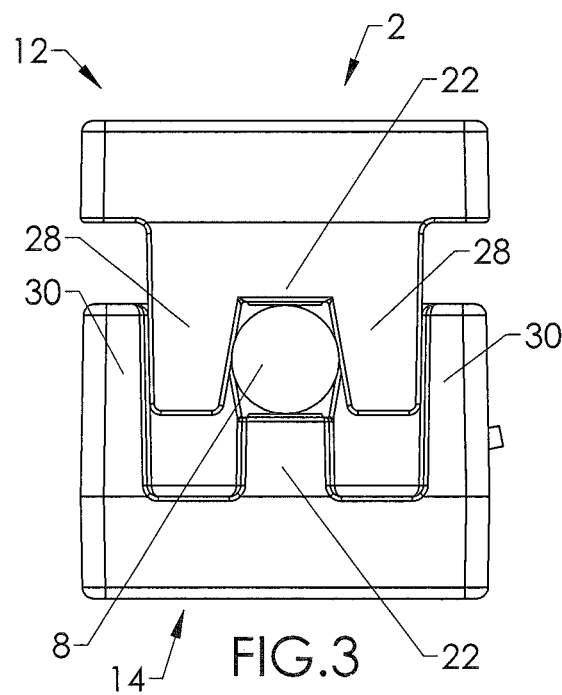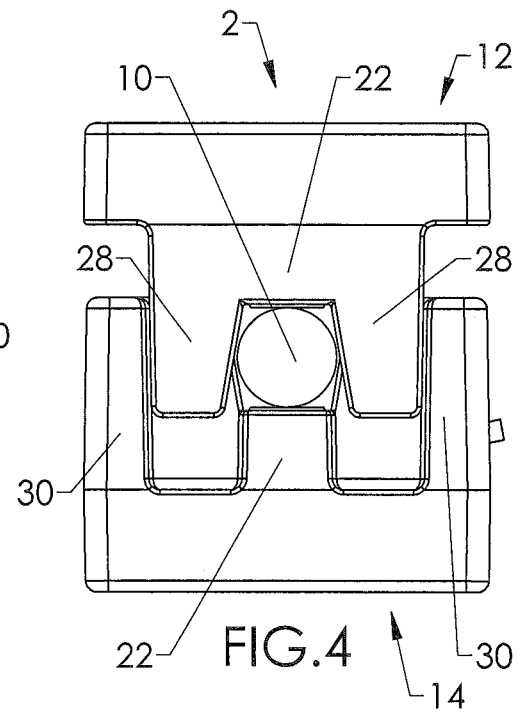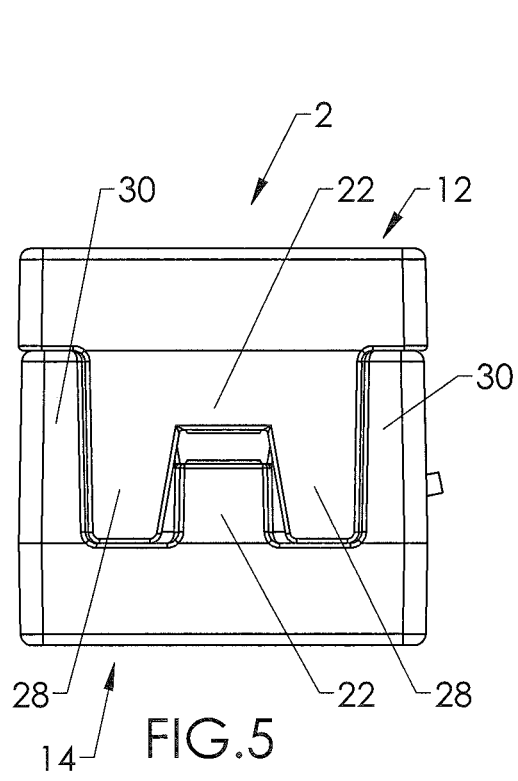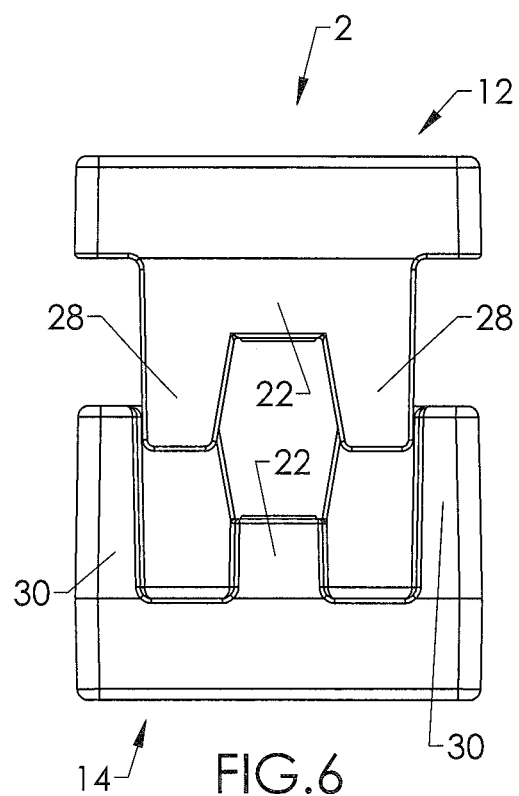

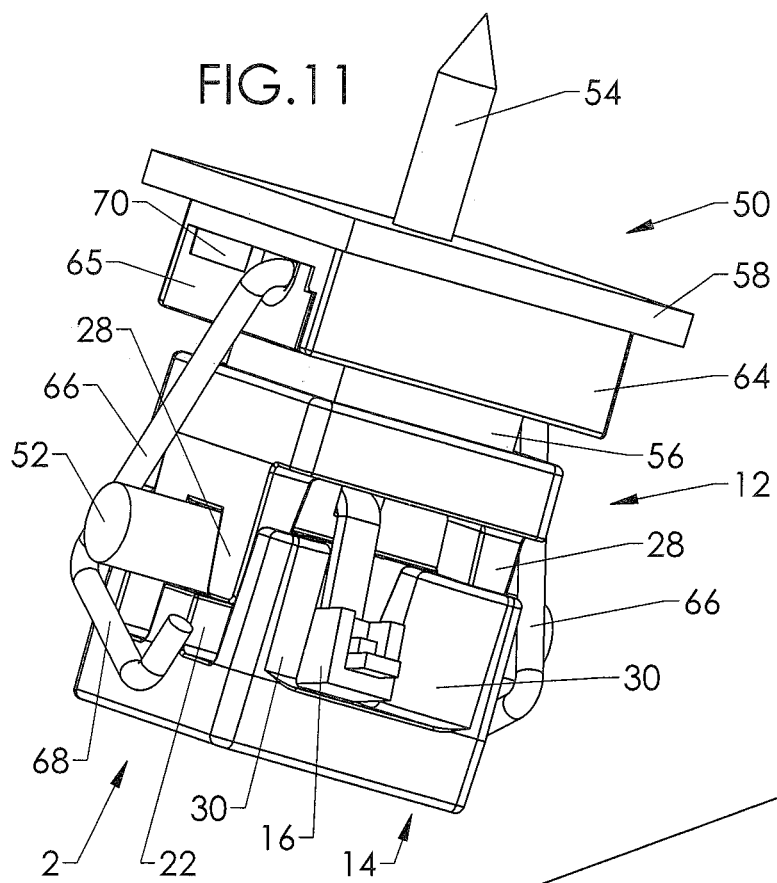
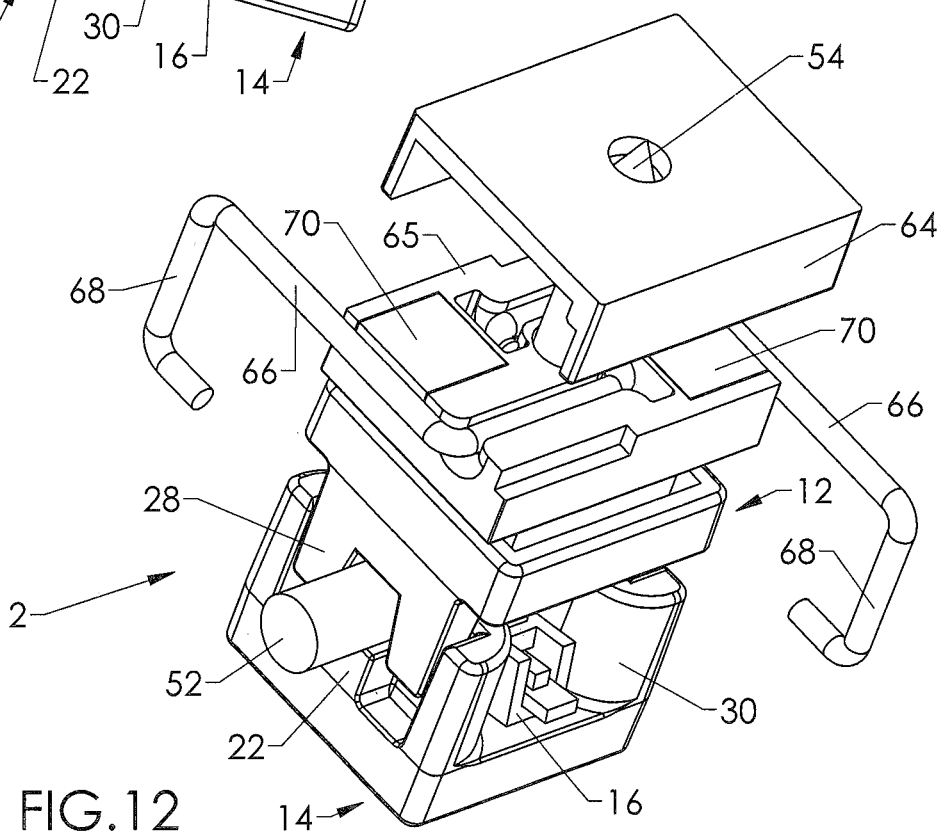

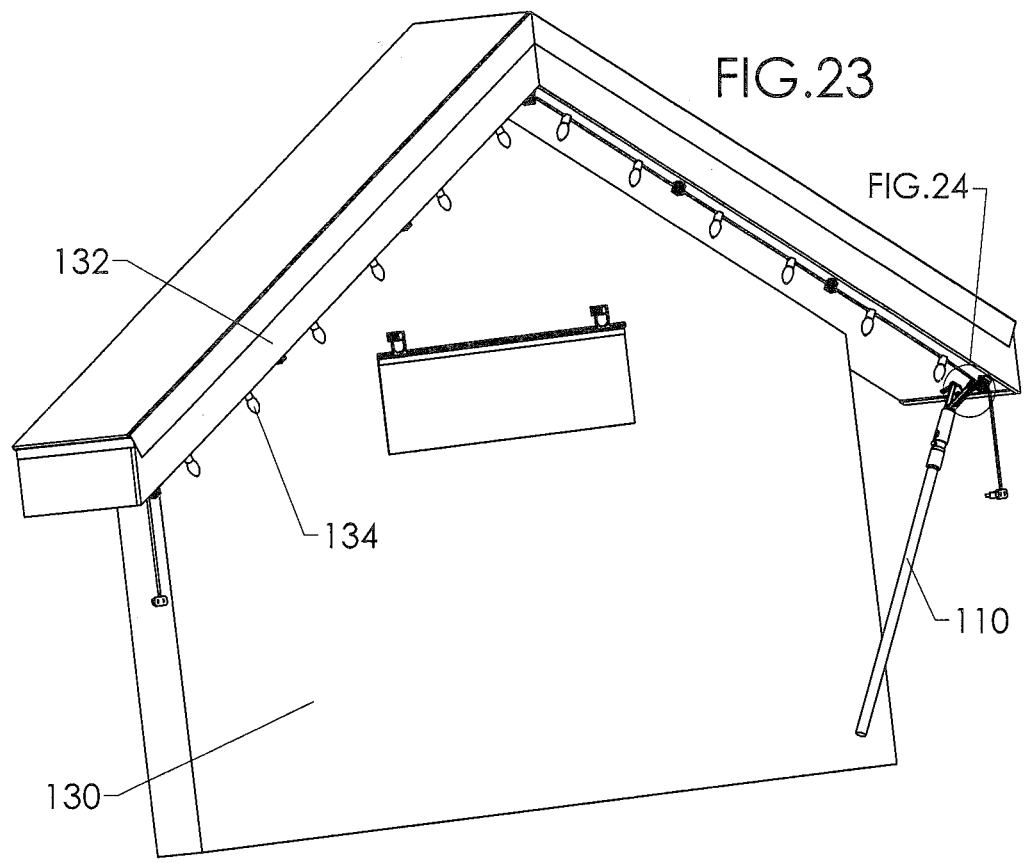
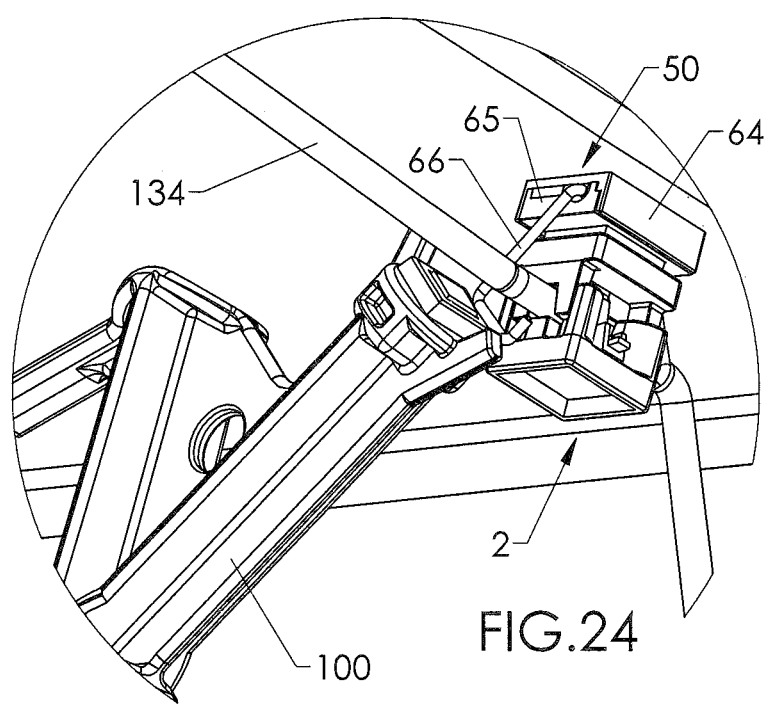

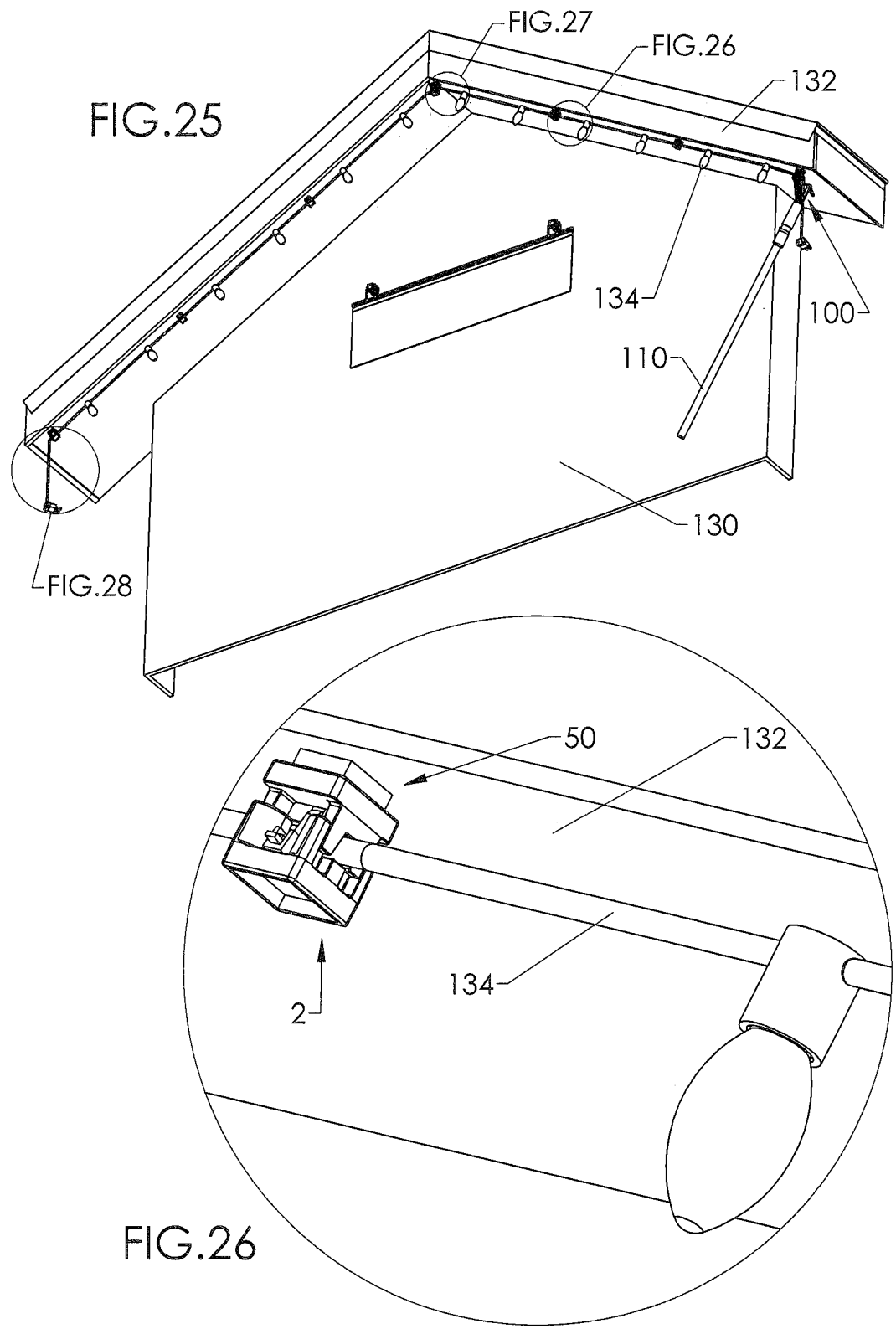

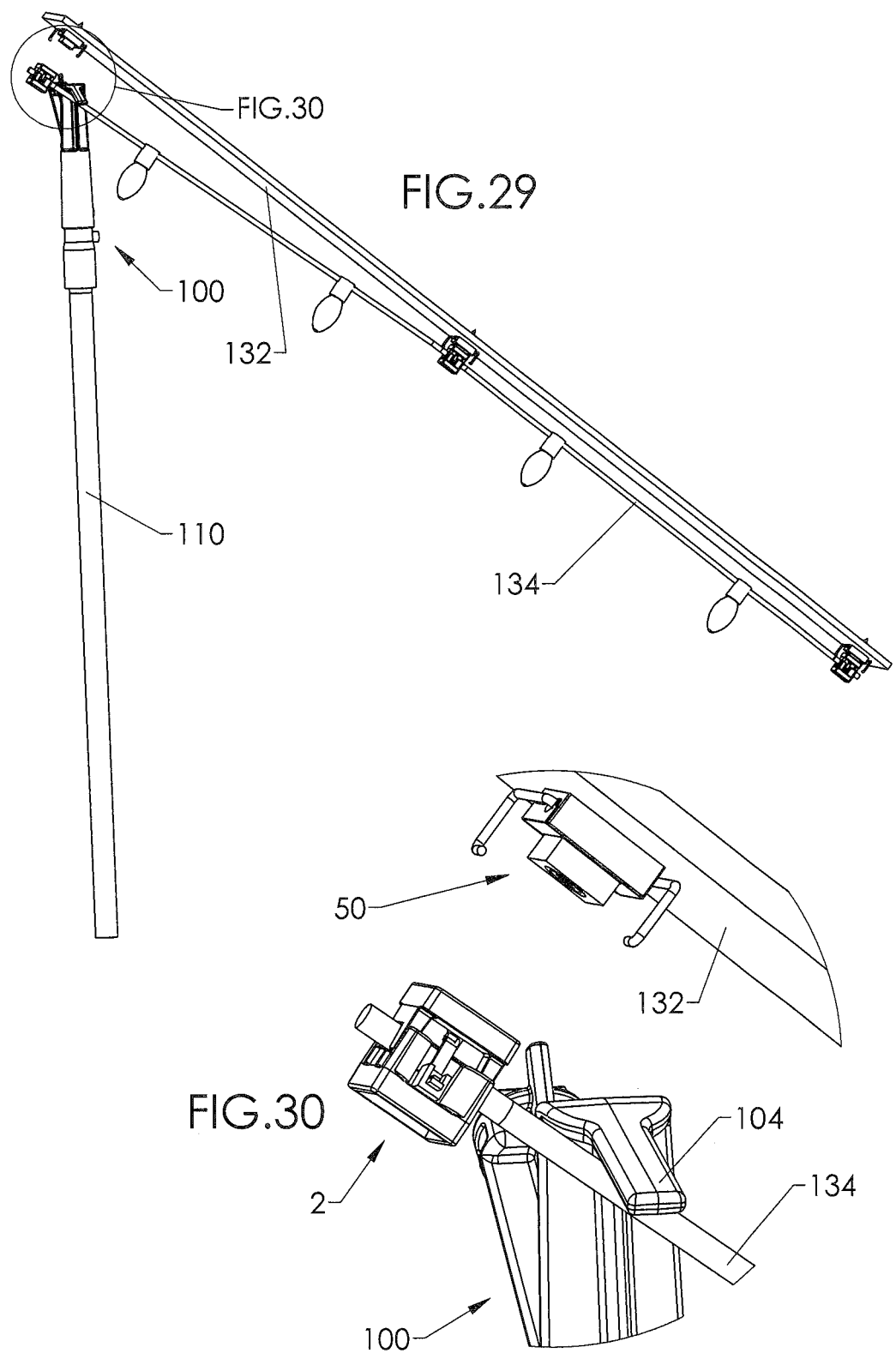

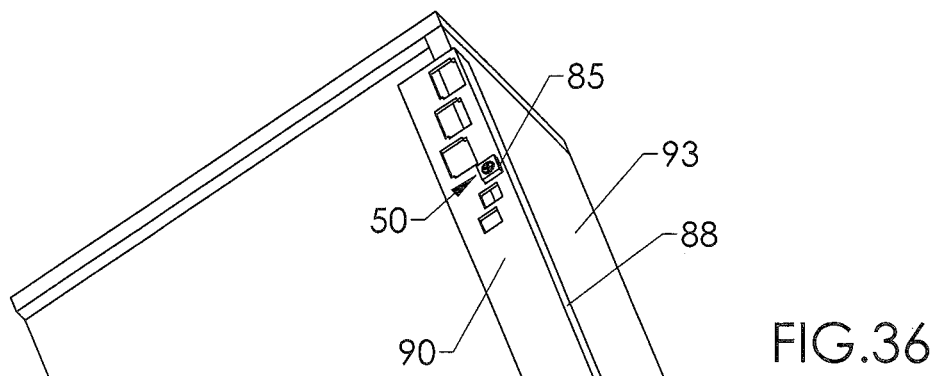
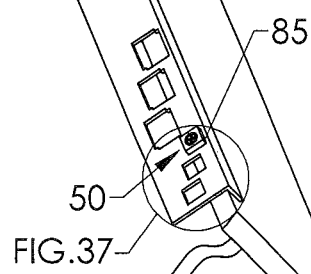
FIG.36
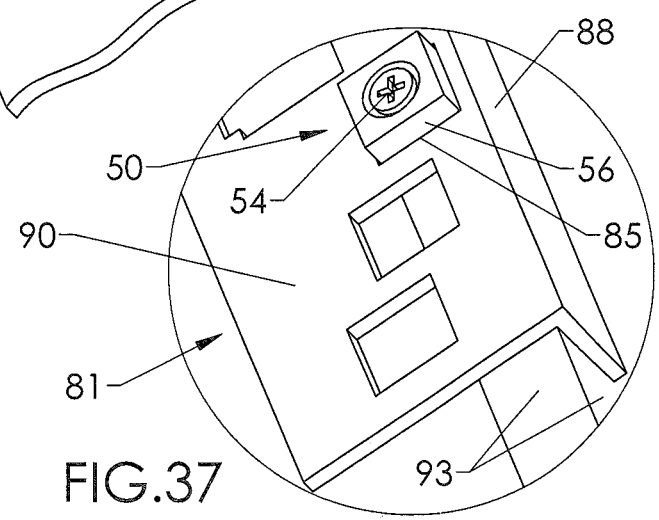
FIG.37

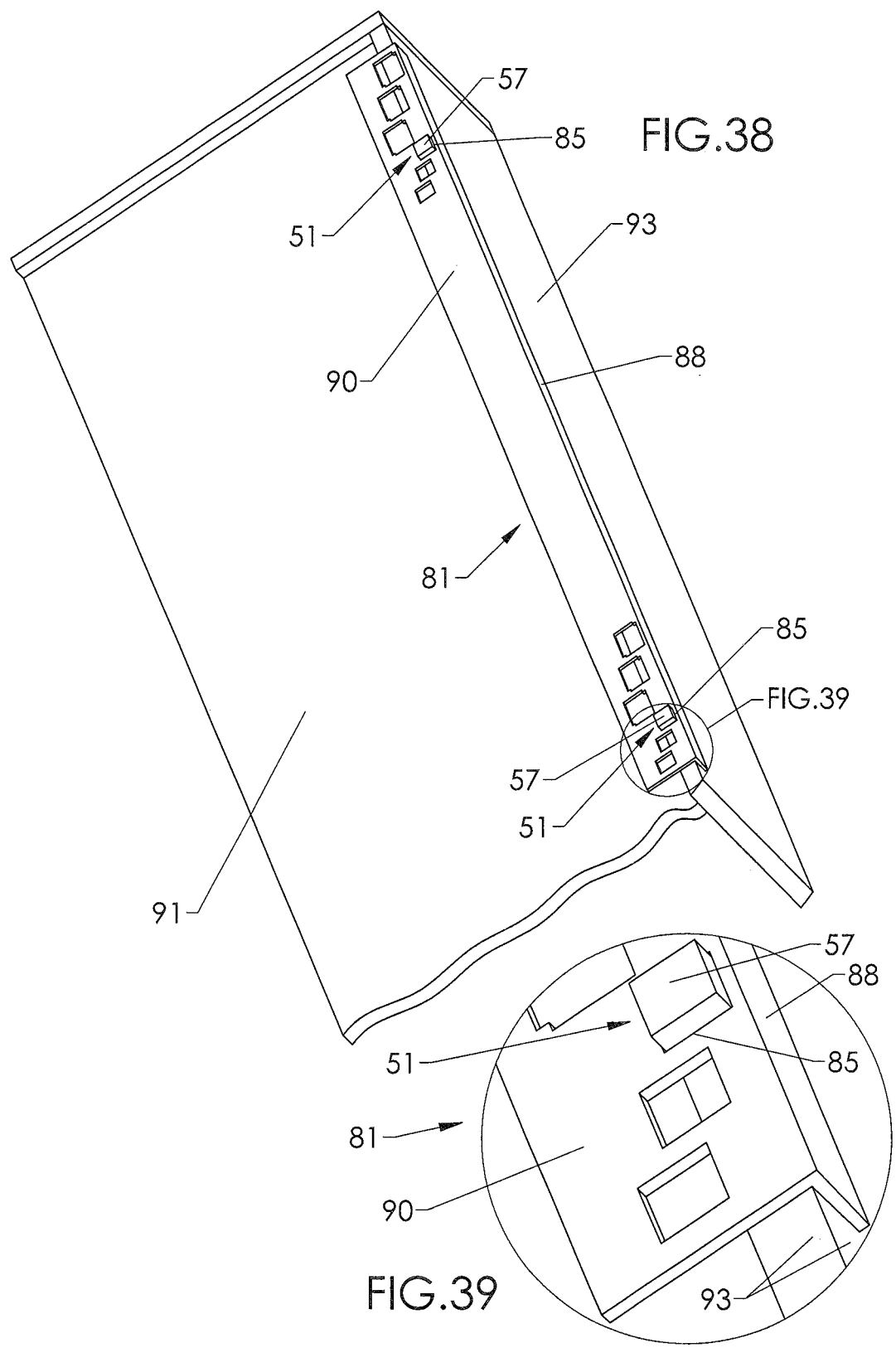

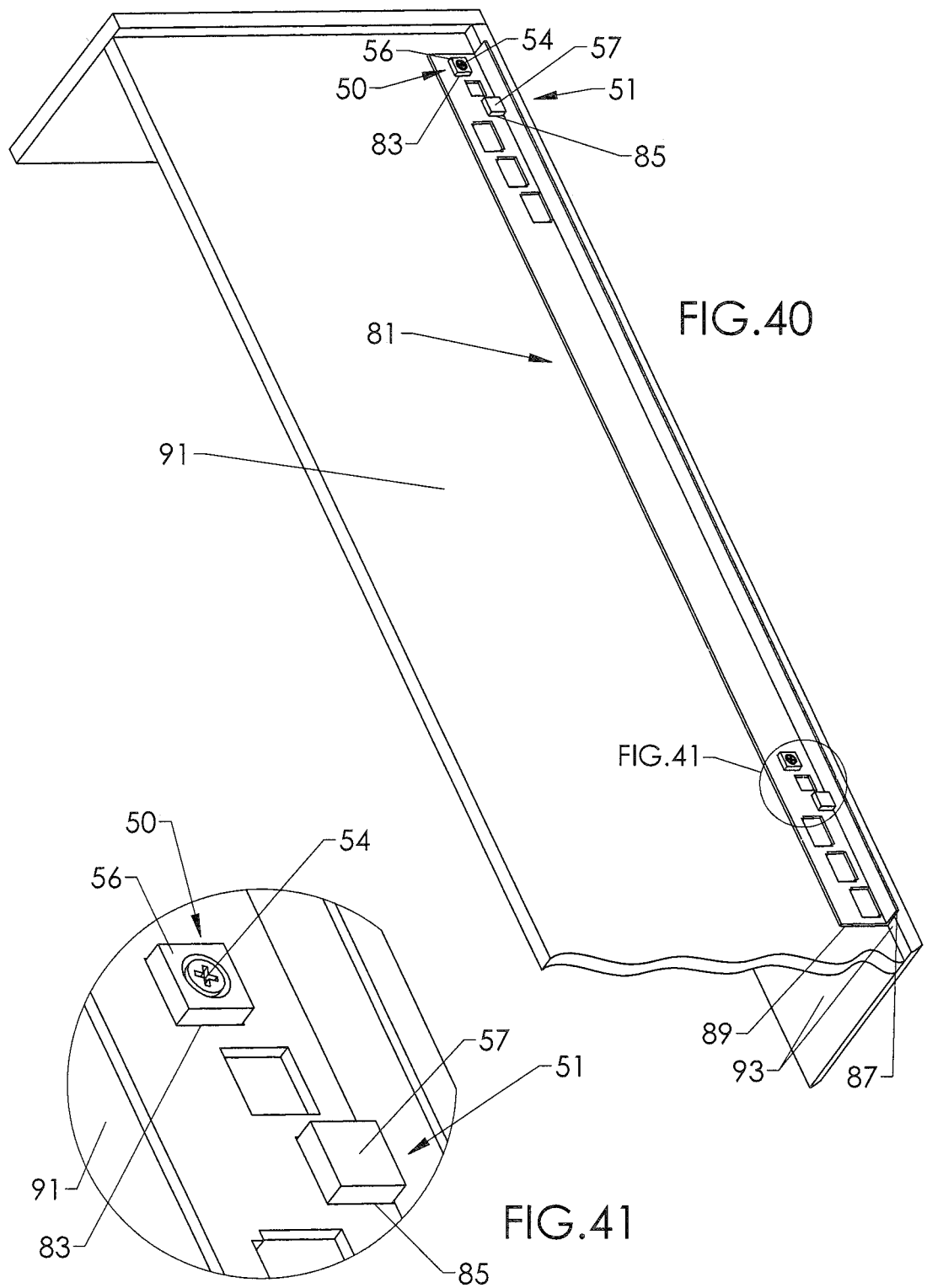

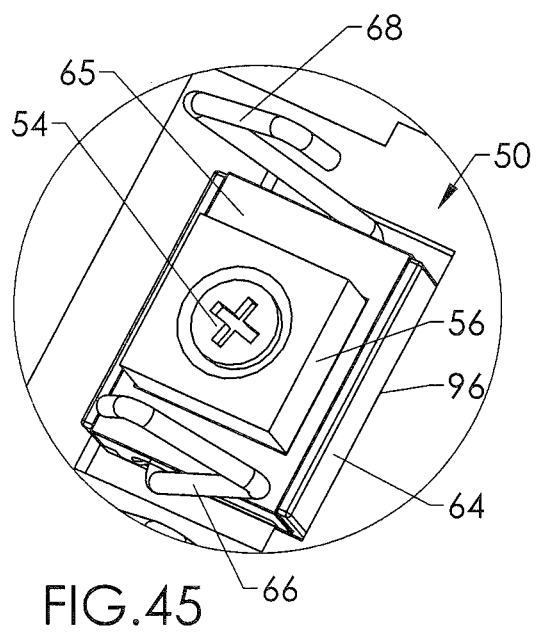
FIG. 45
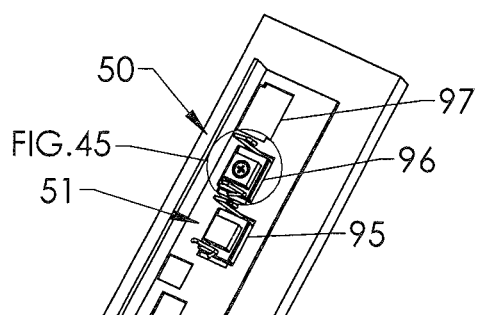
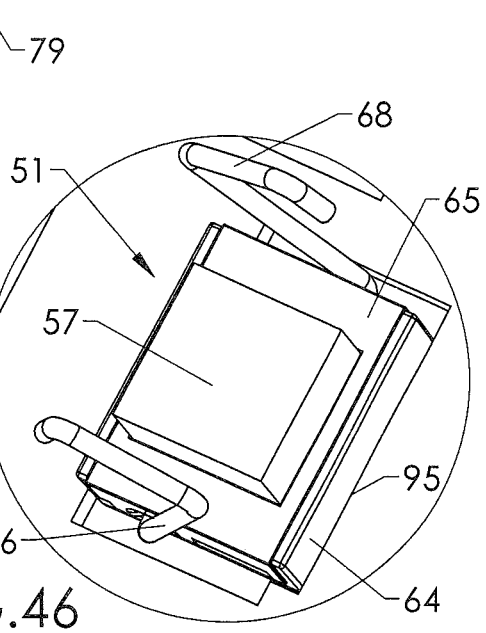
FIG. 44
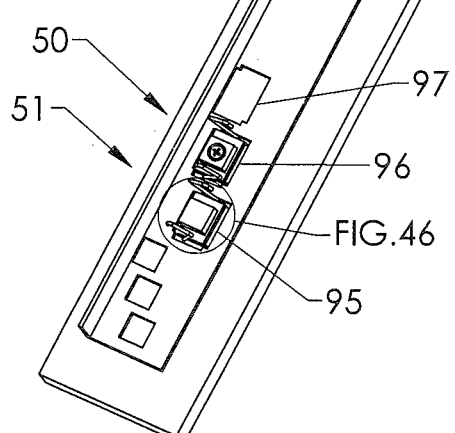
FIG. 46

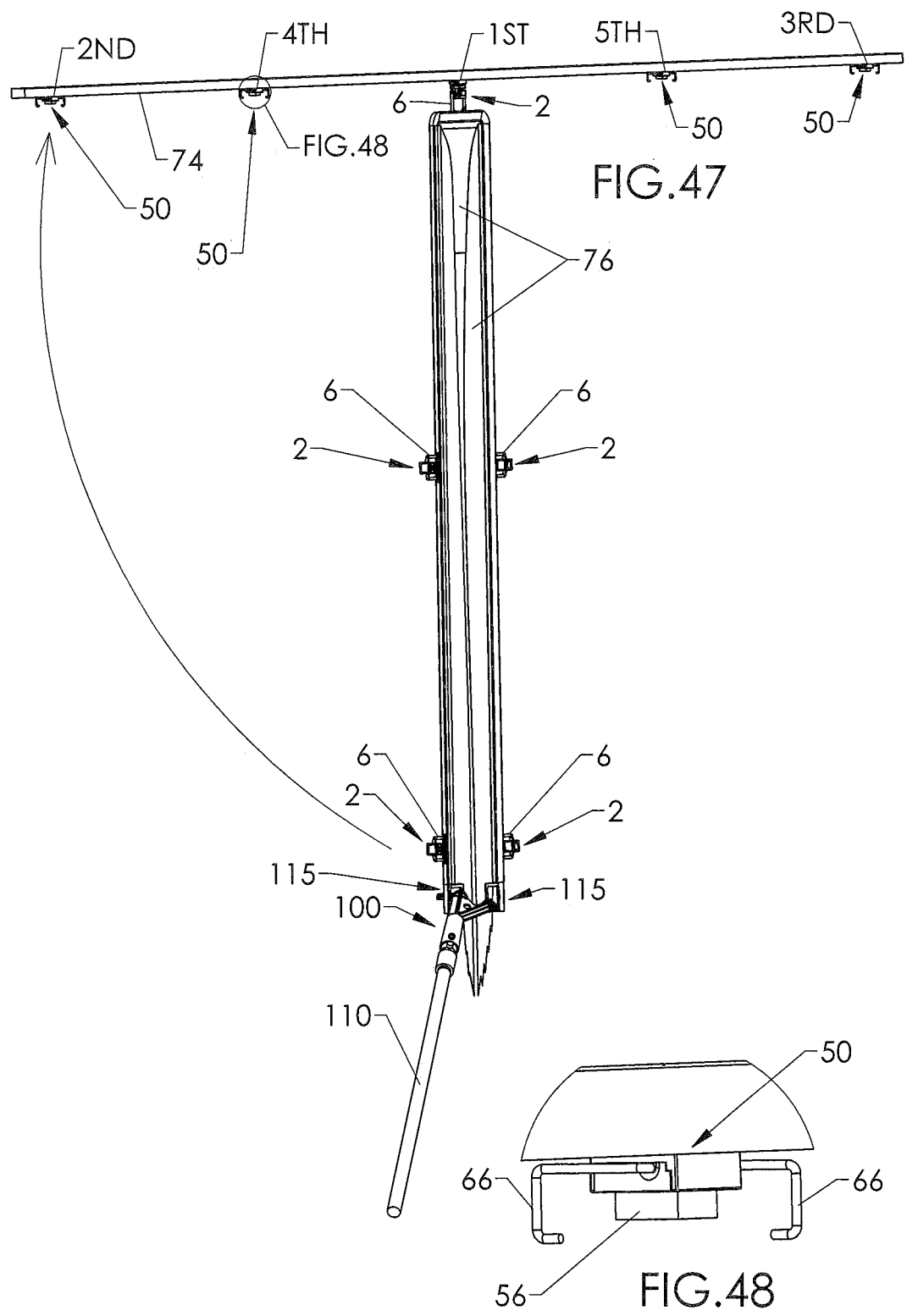

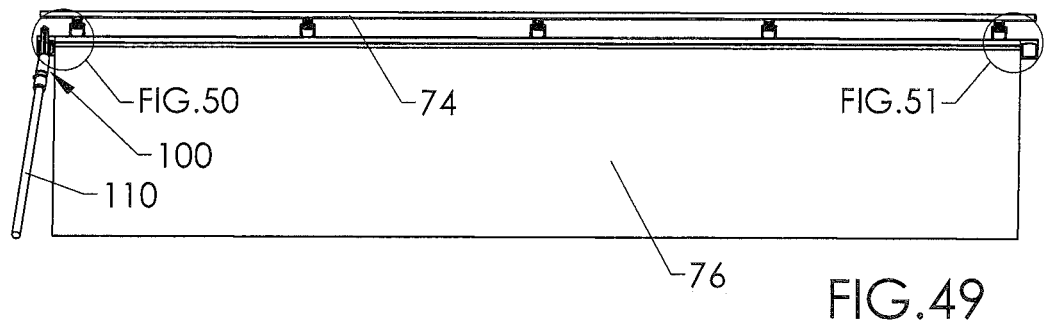
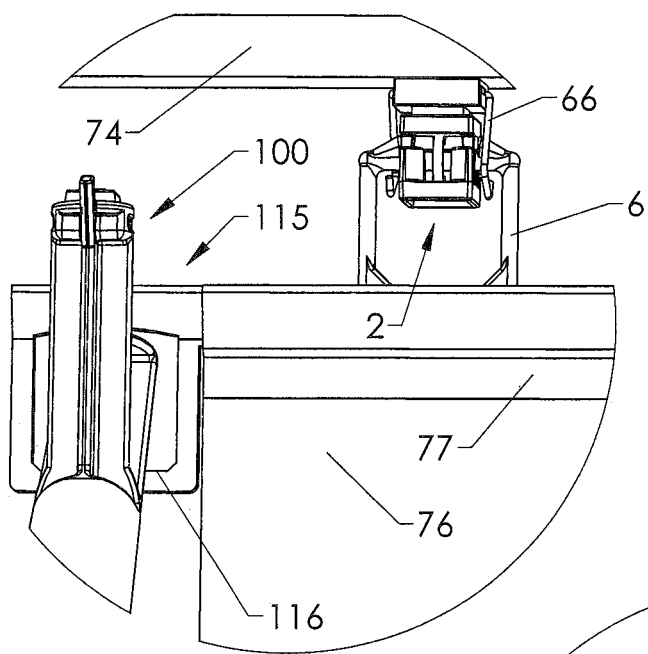
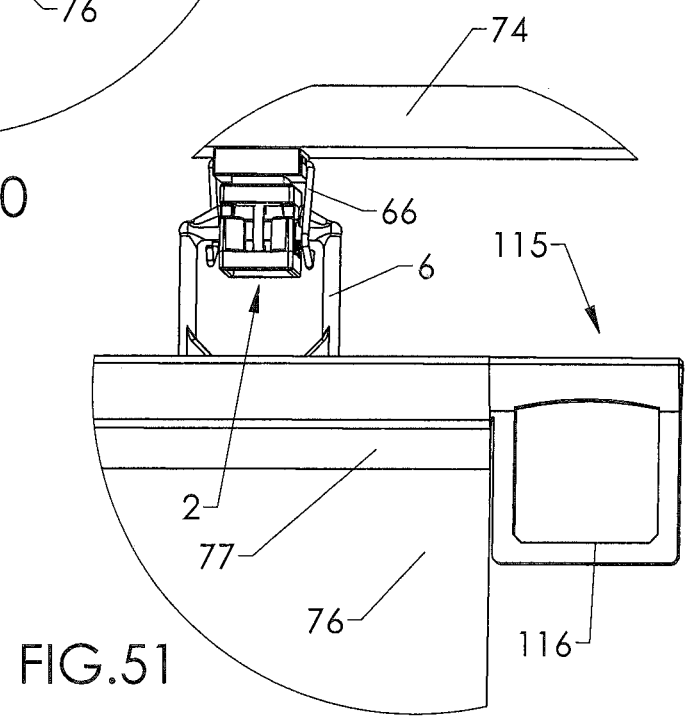

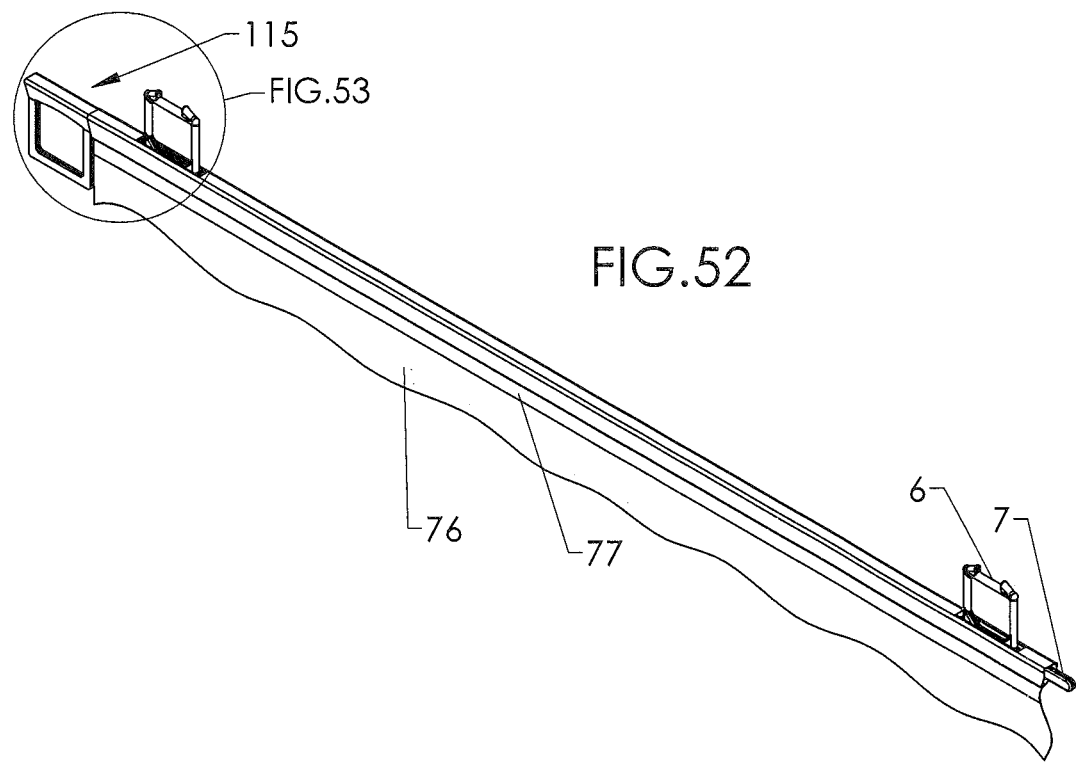
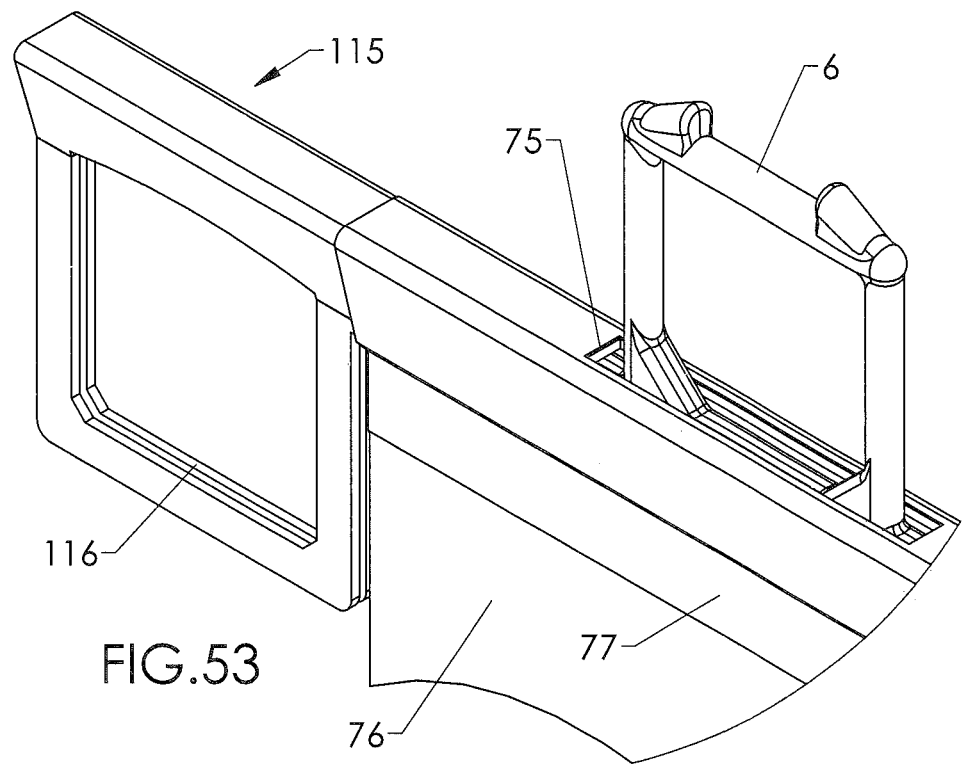

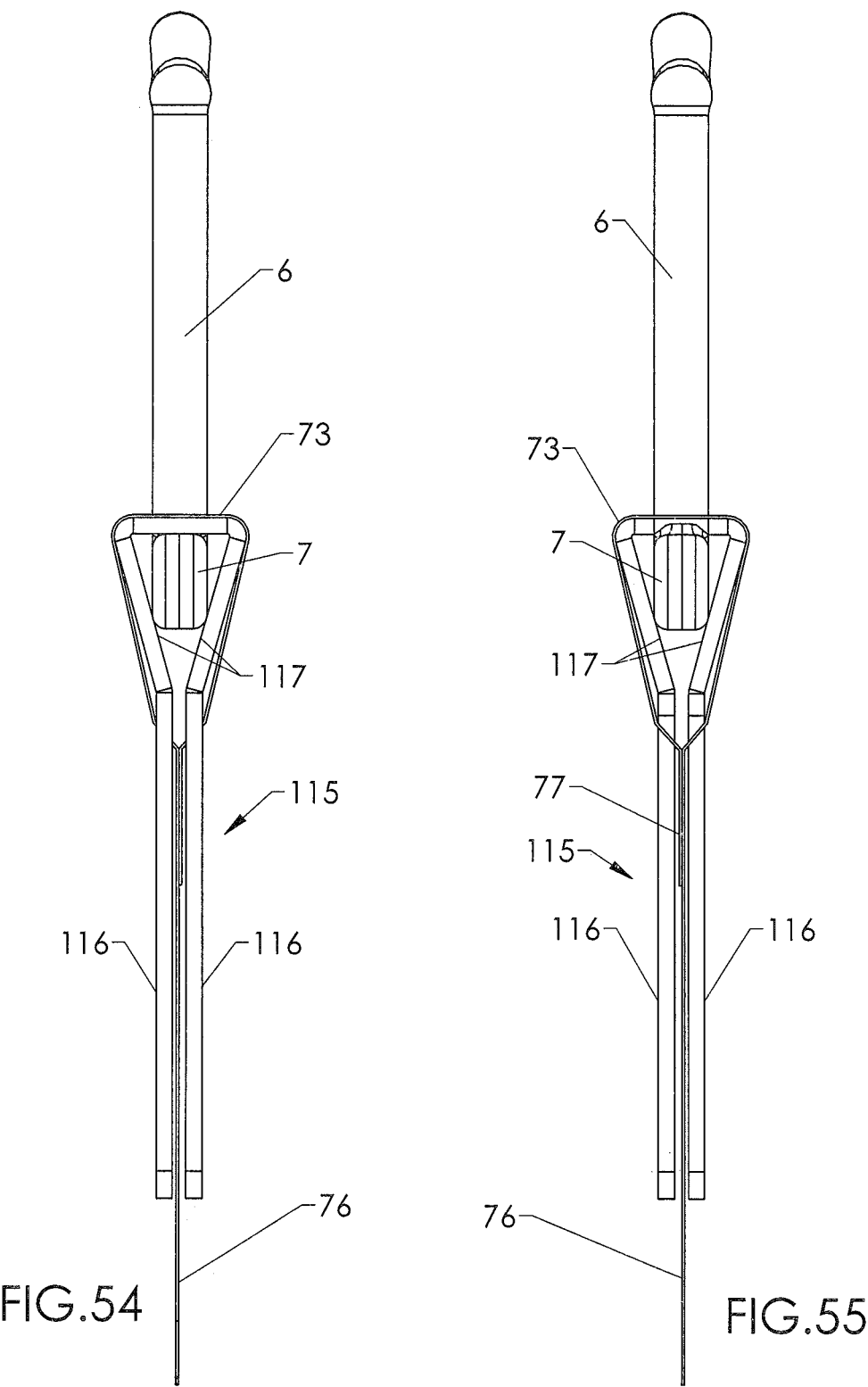

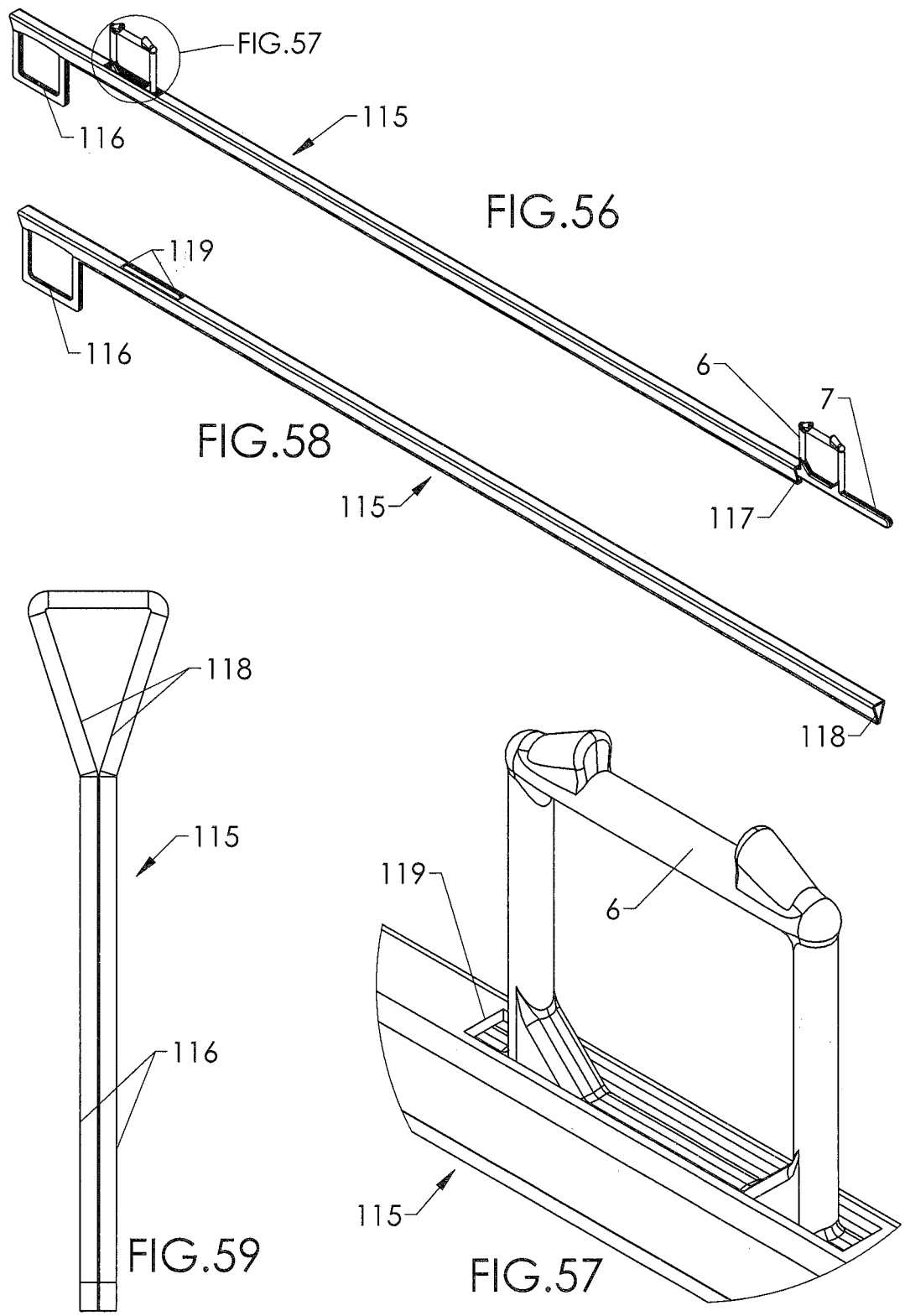

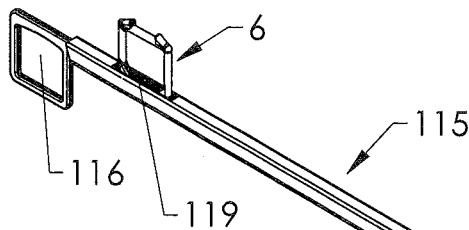
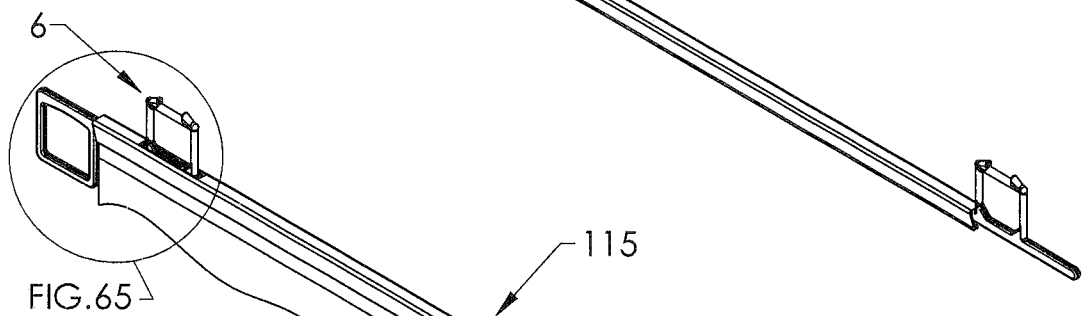
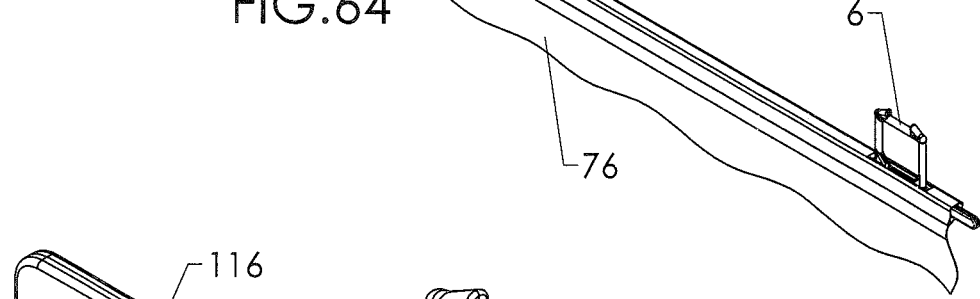
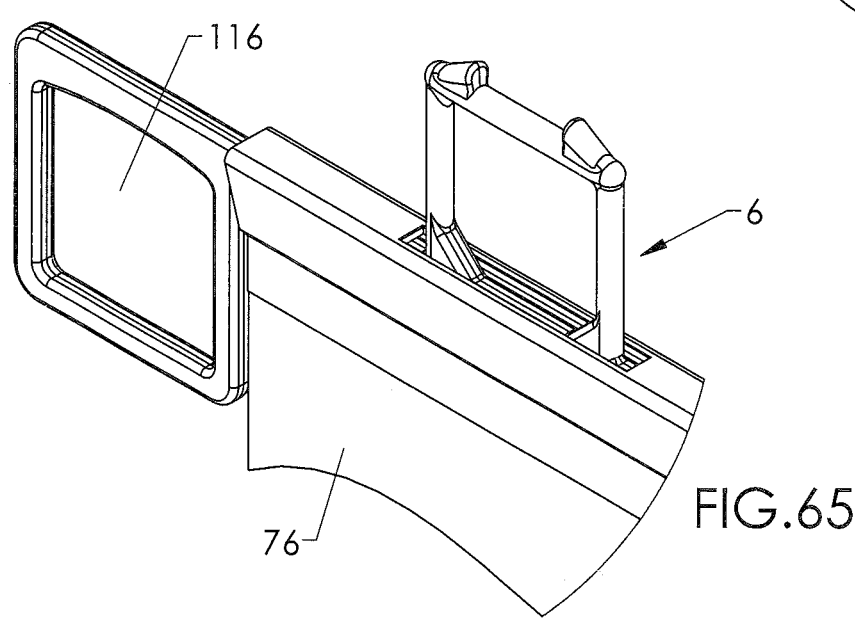

ALL-PURPOSE MOUNTING SYSTEM

BACKGROUND OF THE INVENTION

1. Field of the Invention

The present disclosure relates generally to systems and methods for repeatedly mounting objects (such as, but not limited to, Christmas lights, holiday decorations, banners, flags, signs, and curtains) on a building, wall, or other structure and removing those objects without the repeated use of a ladder.

2. Background and Related Art

Hanging holiday lights on a structure, such as a home or business, can be a tedious and cumbersome process. The lights are commonly placed along elevated locations, such as the eve of a house or the top edge of a wall. As a result, the process of hanging lights often requires use of a ladder. A person usually places the ladder in a location, climbs up the ladder, fastens the light strand to the eve of the house and climbs down the ladder. This process is often repeated every few feet. Taking the lights down follows a similar pattern. Thus, hanging, removing, and re-hanging lights requires repeated use of a ladder. Many who would like to decorate their home or business with lights choose not to do so because of the time, effort, and risk involved.

The eave of a roof on a building can sometimes be a good location for a banner or sign because it elevates the sign or banner for a prominent visual presence. Hanging a banner from on or near its top border often makes it easier for people to read the lettering than the alternative of attaching the banner to a vertical pole along the banner's side border. Business owners may want to frequently change the banner or sign hanging from their business. But changing banners generally requires the repeated use of nails, hooks, clips, rope, or staples. On occasion, signs attached using cords tend to sag over time, diminishing the sign's visual appeal. Attaching and removing a banner or sign using traditional methods can be a tedious and time-consuming process. The repeated use of a ladder to remove and replace a banner exposes employees to the risk of physical injury and creates potential liability to the owner.

SUMMARY

One disclosed embodiment relates to a hanging and mounting system comprising at least one clip assembly to be fastened to an object, the clip assembly comprising a first half having at least two sides, a side that faces substantially opposite the object and a side that faces substantially toward the object, and a connection member attached to the side that faces substantially opposite the object, the connection member being composed at least in part of magnetic material; a second half having at least two sides, a side that faces substantially opposite the object and a side that faces substantially toward the object, and a connection member attached to the side that faces substantially opposite the object, the connection member being composed at least in part of magnetic material; and at least one fastening member configured to fasten the first half and the second half to the object; at least one anchor assembly to be affixed to a structure, the anchor assembly comprising an anchor magnet configured to connect to at least one of the connection members; and an affixing member configured to affix the anchor magnet to the structure; and a mounting head assembly comprising a mounting head and a mounting-head magnet configured to connect to at least one of the connection members, the mounting-head magnet being attached to the tip of the mounting head.

BRIEF DESCRIPTION OF THE DRAWINGS

In order for the manner in which the above recited and other features and advantages of the present invention are obtained, a more particular description of the invention will be rendered by reference to a specific embodiment thereof, which is illustrated in the appended drawings. Understanding that the drawings depict only an exemplary embodiment of the present invention and are not, therefore, considered as limiting the scope of the invention, the present invention will be described and explained with additional specificity and detail through the use of the accompanying drawings in which:

FIG. 3 illustrates a cross-sectional view of an exemplary embodiment of a clip assembly;

FIG. 4 illustrates a cross-sectional view of an exemplary embodiment of a clip assembly;

FIG. 5 illustrates a cross-sectional view of an exemplary embodiment of a clip assembly;

FIG. 6 illustrates a cross-sectional view of an exemplary embodiment of a clip assembly;

FIG. 11 illustrates an exemplary embodiment of a clip assembly connected to an exemplary embodiment of an anchor assembly with a safety hook base;

FIG. 12 illustrates an exemplary embodiment of a clip assembly connected to an exemplary embodiment of an anchor assembly with a safety hook base;

FIG. 23 illustrates the use of exemplary embodiments of clip assemblies and anchor assemblies to support a strand of lights on an eve of a house.

FIG. 24 illustrates a close-up view of a portion of FIG. 23.

FIG. 25 illustrates the use of exemplary embodiments of clip assemblies and anchor assemblies to support a strand of lights on an eve of a house.

FIG. 26 illustrates a close-up view of a portion of FIG. 25.

FIG. 29 illustrates an exemplary embodiment of the mounting head assembly and pole being used to remove the strand of lights from the underside of the eve of a house.

FIG. 30 illustrates a close-up view of a portion of FIG. 29.

FIG. 36 shows an exemplary embodiment where ruler is used to space and mount anchor assemblies.

FIG. 37 shows a close-up view of the exemplary embodiment shown in FIG. 36.

FIG. 38 illustrates an exemplary embodiment where ruler is used to space and mount magnet assembly.

FIG. 39 illustrates a close-up view of the exemplary embodiment shown in FIG. 38.

FIG. 40 illustrates an exemplary embodiment where ruler is used to install a screw on anchor assembly and to install the tape (not shown) on the soffit area of the eave.

FIG. 41 illustrates a close-up view of the exemplary embodiment shown in FIG. 40.

FIG. 44 illustrates an exemplary embodiment where anchor assembly is located in and aligned with larger middle hole set, and where magnet assembly is located in and aligned with larger far hole set.

FIG. 45 illustrates an exemplary embodiment where anchor assembly is located in and aligned with larger middle hole set.

FIG. 46 illustrates an exemplary embodiment where magnet assembly is located in and aligned with larger far hole set.

FIG. 47 illustrates an isometric view showing the use of two spine clip assemblies.

FIG. 48 illustrates a close up view of a portion of FIG. 47.

FIG. 49 illustrates an embodiment with banner fully installed.

FIG. 50 illustrates a close-up view of a portion of FIG. 49, showing more detail of the left side of the banner and how the mounting head assembly is positioned in a loop hole.

FIG. 51 shows a close-up view of the right side of the banner that also shows close-up views of the spine assembly and spine clip loop hole.

FIG. 52 illustrates a shortened banner section with banner hangers, spine clip assembly and banner hanger t arm.

FIG. 53 shows a close up view of the left side of FIG. 52.

FIG. 54 is a left end view of FIG. 52.

FIG. 55 is a right end view of FIG. 52.

FIG. 56 is an isometric view of the spine clip assembly and two banner hangers.

FIG. 57 shows a close up view of the spine clip assembly, including a hole in the spine clip that allows the banner hanger to protrude.

FIG. 58 is an isometric view of the spine clip assembly shown in a closed or relaxed state.

FIG. 59 is a left end view of figure that shows a closed or relaxed state of the spine clip assembly, also showing the spine clip loop holes being closed together.

FIG. 63 illustrates an isometric view of the spine clip assembly and two banner hangers.

FIG. 64 illustrates an isometric view of the spine clip assembly showing two banner hangers that can be detached and also shows banner.

FIG. 65 illustrates a close up view of the spine clip assembly where the banner hanger and spine clip loop hole can be separated from the spine clip assembly.

DETAILED DESCRIPTION OF THE INVENTION

Figure 1:
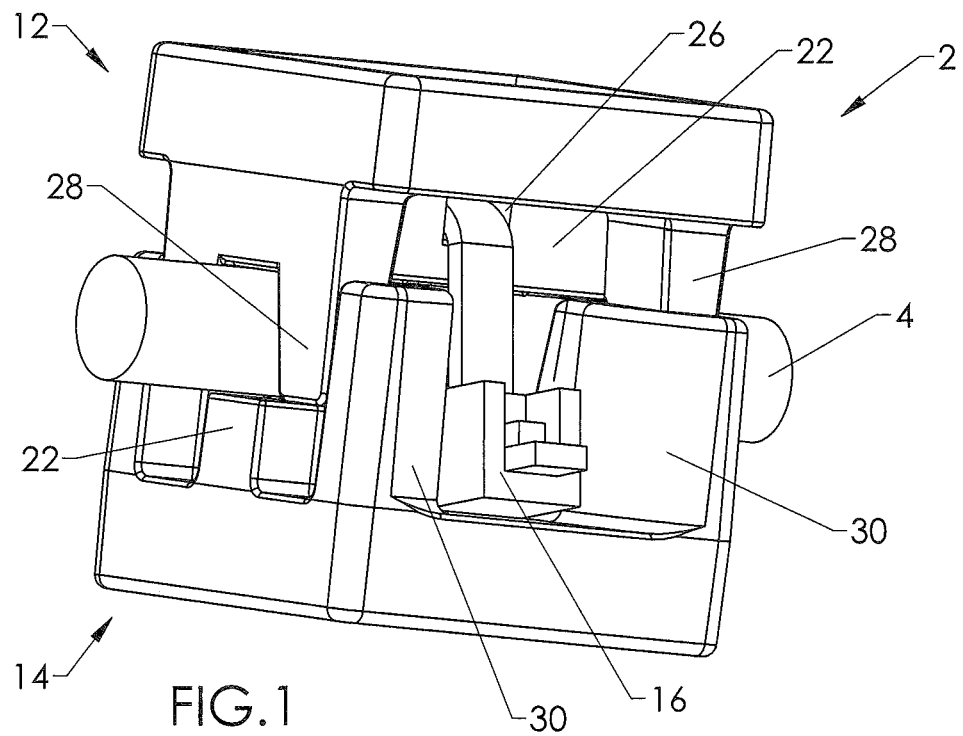
FIG. 1 illustrates an exemplary embodiment of a clip assembly.

The present disclosure relates to an all-purpose mounting system. FIGS. 1-59 and the corresponding discussion are intended to provide a general description of one exemplary embodiment in which the invention may be configured and implemented. One skilled in the art though will appreciate that the disclosure may be embodied by a variety of configurations.

Figure 2:
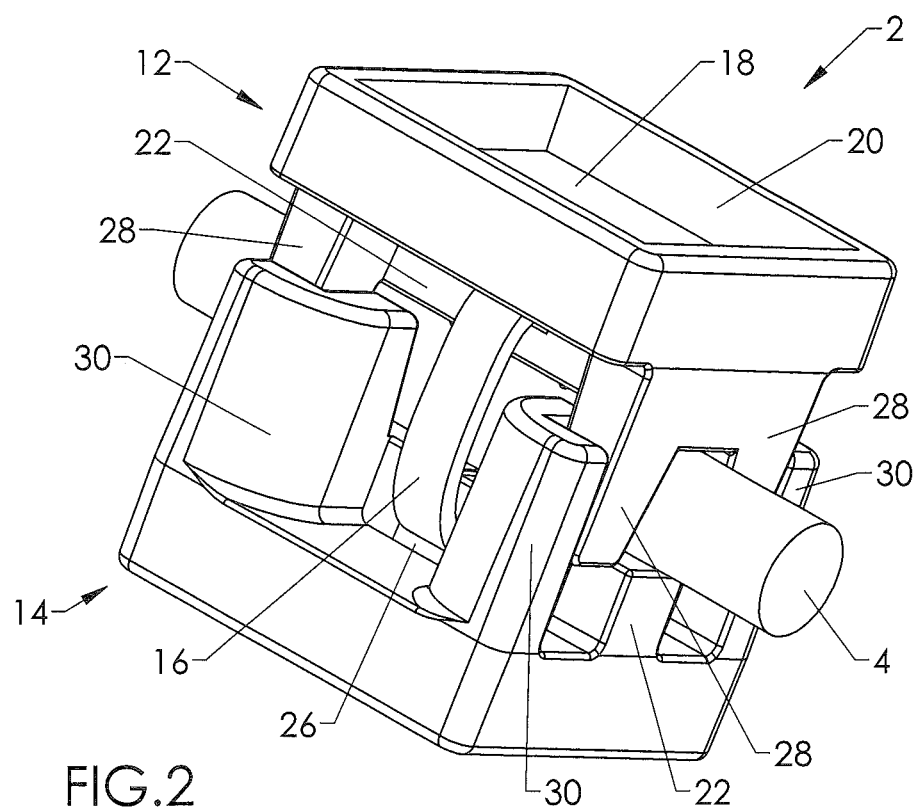
FIG. 2 illustrates an exemplary embodiment of a clip assembly.
Figure 7:
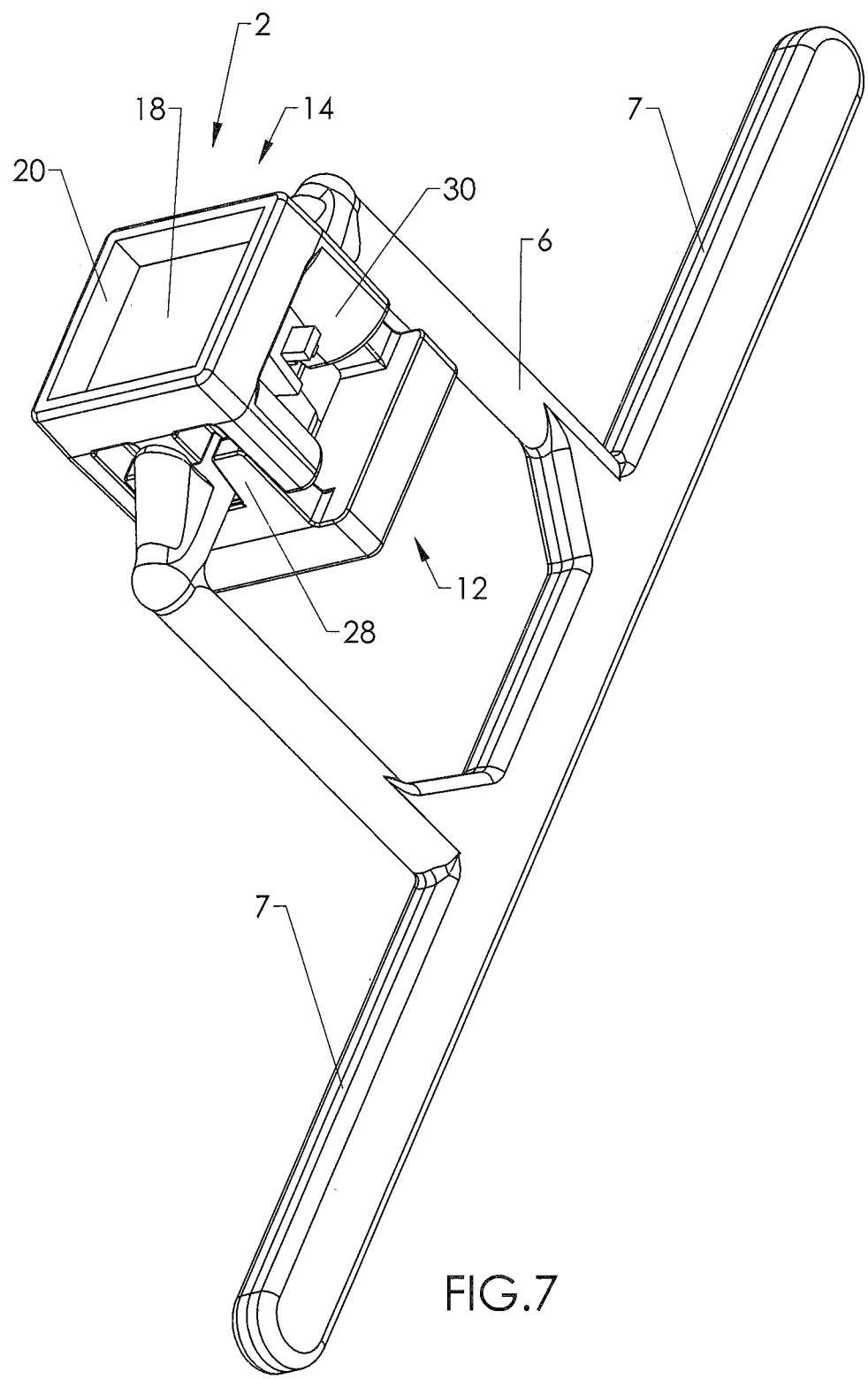
FIG. 7 illustrates an exemplary embodiment of a clip assembly and an exemplary embodiment of a banner hanger.

FIGS. 1 and 2 show an exemplary embodiment of a clip assembly 2. The clip assembly 2 is configured to fasten to an object 4 (not shown) such that the clip assembly 2 remains substantially stationary on the object 4. Clip assembly 2 can be made of a variety of materials including but not limited to a variety of mold injection thermoplastic materials including but not limited to: ABS, polycarbonate, PVC and nylon. In some embodiments, the object 4 is a strand of wire. In other embodiments, as shown in FIG. 7, the object 4 is a banner hanger 6, and a banner hanger t arm 7. In other embodiments, the clip assembly 2 may be fastened to a strand of lights, garland, string, rope, pennant string, a hook, a rod, or a strand of beads.

FIGS. 3 through 6 show end views of an exemplary embodiment of the clip assembly 2. As shown in these figures, the exemplary embodiment of the clip assembly 2 can be fastened to objects of different sizes. FIG. 3 illustrates a cross-sectional view of a strand of wire 8 having a diameter larger than the diameter of a strand of wire 10 shown in FIG. 4. FIG. 5 illustrates that the exemplary embodiment of the clip assembly 2 can be adjusted to accommodate an object smaller than the strand of wire 8 shown in FIG. 3. FIG. 6 illustrates that the exemplary embodiment of the clip assembly 2 can be adjusted to accommodate an object larger than the strand of wire shown in FIG. 4.

Figure 8:
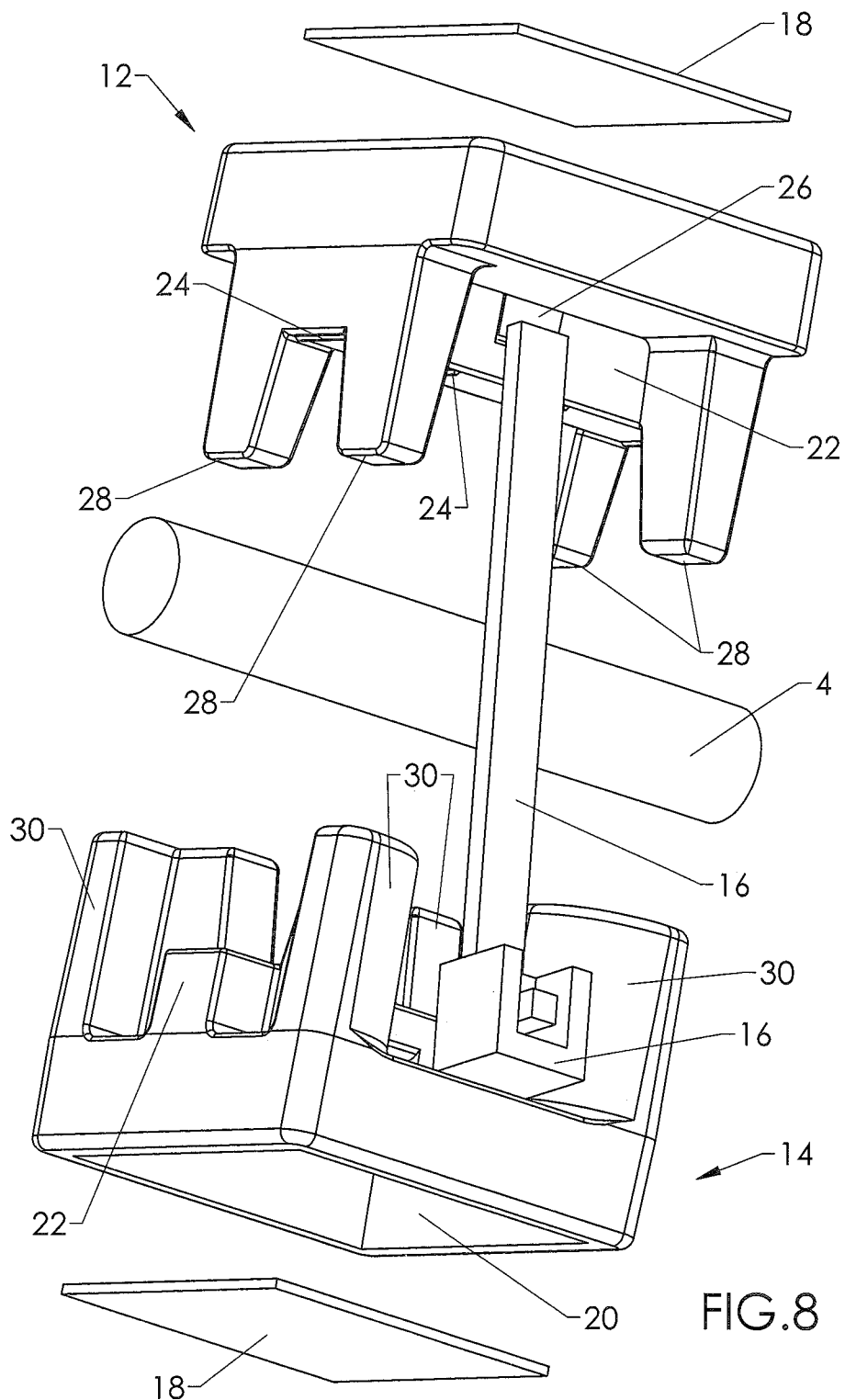
FIG. 8 is an exploded view of an exemplary embodiment of a clip assembly.

As shown in FIG. 8, the clip assembly 2 may be comprised of two halves, a first half 12 and a second half 14. In the exemplary embodiment of the clip assembly 2 shown, the first half 12 and the second half 14 both have a side that faces substantially toward the object and a side that faces substantially away from the object. In the exemplary embodiment shown, the first half 12 and the second half 14 are two separate pieces. It is also contemplated, however, that a clip assembly may have a first half and a second half that are two portions of a single physical object. For example, each prong of a binder clip may be considered a first half and a second half even though they are two parts of a single physical object. Each prong of a binder clip has a side that faces substantially toward the object to which the binder clip is attached a side that faces substantially opposite from the object to which the binder clip is attached. In the exemplary embodiment, the first half 12 and the second half 14 are not identical. It is contemplated, however, that in other embodiments, the first half and the second half may be substantially identical.

In the exemplary embodiment of the clip assembly 2 shown in FIG. 8, a fastening member 16 is used to fasten the first half 12 and the second half 14 to an object 4. In certain embodiments, the fastening member 16 acts to press, squeeze, or pull the first half 12 and the second half 14 onto the object such that the clip assembly 2 remains substantially stationary on the object 4. In the exemplary embodiment, it is intended that the clip assembly 2 remain on the object 4 semi-permanently. In other embodiments, it is contemplated that the clip assembly will be fastened to and removed from the object with each use. In the exemplary embodiment of the clip assembly 2, the fastening member 16 is a three inch long mini nylon zip tie. In other embodiments, other types of fastening members are contemplated, such as, for example, zip ties of a variety of sizes and materials, a string, a hinge, a clamp, screws, rivets, and push fasteners. The fastening member may also be part of the structure of the clip assembly, such as the base of a binder clip, which forces the two prongs of the binder clip together. In some embodiments, as in the exemplary embodiment shown in FIG. 8, the fastening member 16 acts to couple the first half 12 and the second half 14.

Figure 20:
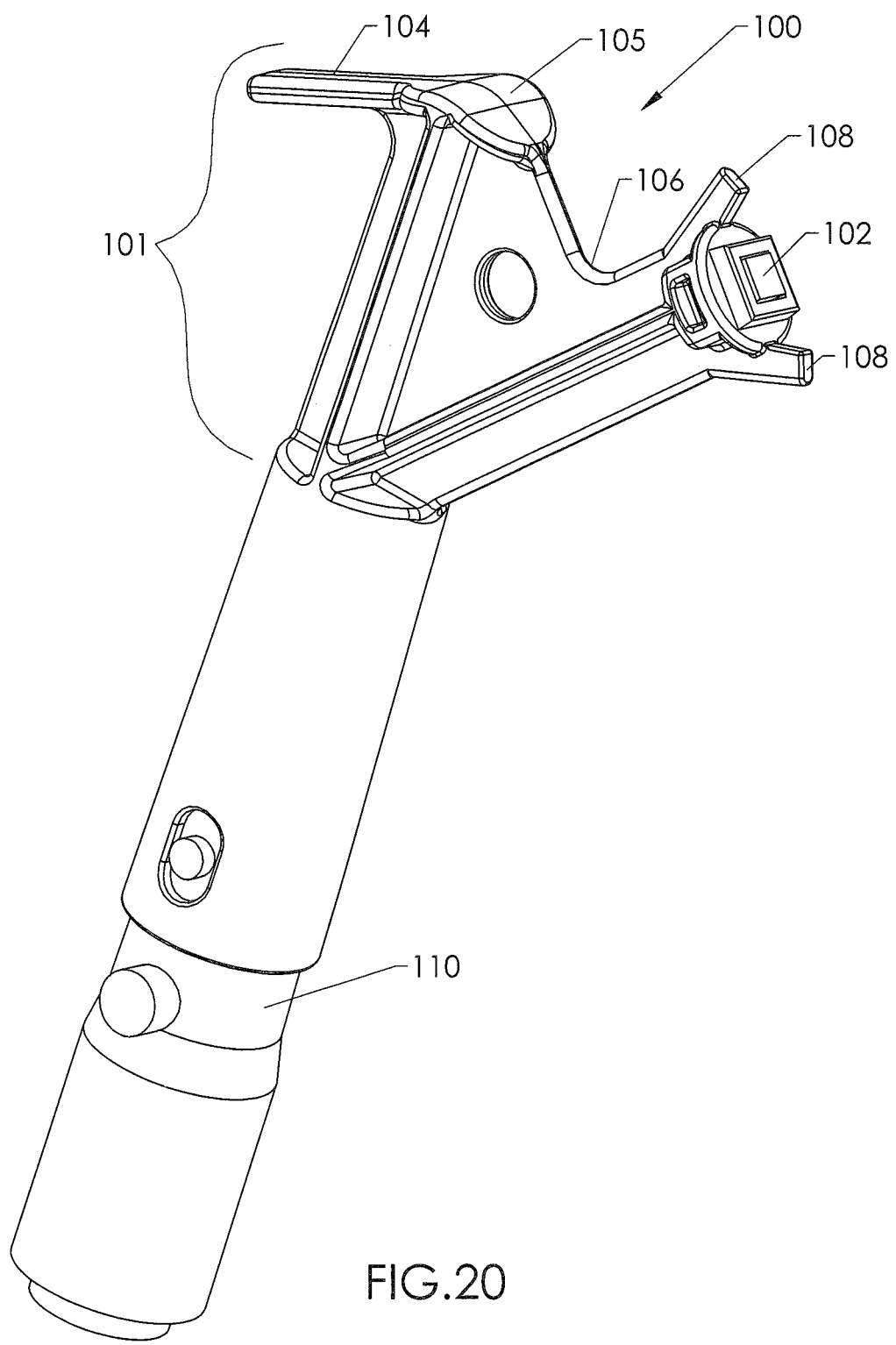
FIG. 20 illustrates an exemplary embodiment of a mounting head attached to a pole.
Figure 21:
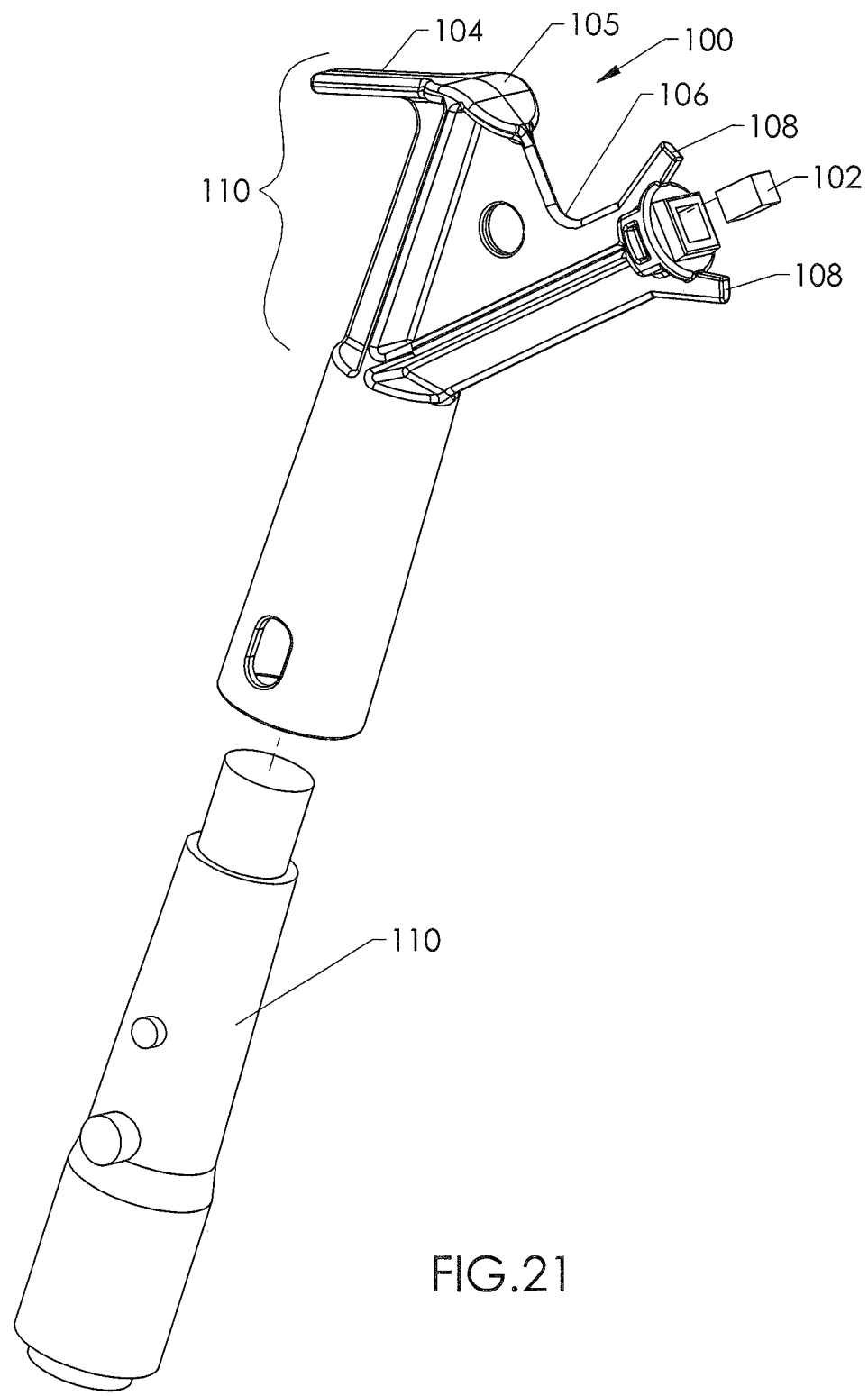
FIG. 21 illustrates an exploded view of FIG. 20.

In the exemplary embodiment of the clip assembly 2 shown in FIG. 8, a connection member 18 is attached to the first half 12 such that the connection member 18 is on the side of the first half 12 that faces away from the object 4. In the exemplary embodiment of the clip assembly 2, a connection member 18 is also attached to the second half 14 such that the connection member 18 is on the side of the second half 14 that faces away from the object 4. The connection members 18 are configured to connect to an anchor magnet 56 (as shown is FIGS. 9 and 10) and a mounting-head magnet 102 (as shown in FIGS. 20 and 21). In some embodiments, the connection members 18 are galvanized steel plates having sides of 0.5 inches. In some embodiments, the connection members are made from other magnetic material, are larger or smaller, or take the form of other shapes and thicknesses. In some embodiments, the first half and the second half may be constructed of magnetic material and function themselves as connection members.

In the exemplary embodiment of the clip assembly 2 shown in FIG. 2, the sides of the first half 12 and the second half 14 that face away from the object 4 have a walled-in hollow area 20, and the connection member 18 is placed at the base of the walled-in hollow area 20. In other embodiments, the sides of the first half and the second half facing away from the object are closed or solid and the connection member is placed on the top surface.

In the exemplary embodiment of the clip assembly 2 shown in FIGS. 1, 2, and 8, the walled-in hollow areas 20 are substantially square. In other embodiments, other shapes are contemplated, such as, for example, a substantially rectangular, circular, curved, triangular, or polygonal shape.

In the exemplary embodiment of the clip assembly 2, the first half 12 and the second half 14 each has a protrusion 22 on the side facing the object 4. In some embodiments, the protrusion 22 has one or more bumps 24. The protrusion 22 and the bumps 24 act to improve the grip of the clip assembly 2 on the object 4.

In the exemplary embodiment, the protrusion 22 has a tunnel 26 that extends from one side to the other, and the fastening member 16 is inserted through the tunnel 26. In some embodiments, such as embodiments that do not have a protrusion, the tunnel may begin, end, and travel through another part of the first half and/or the second half. In other embodiments, a tunnel is not present because the type of fastening member used does not require a tunnel.

In the exemplary embodiment of the clip assembly 2, four extensions 28 extend from the side of the first half 12 facing the object 4. In some embodiments, the inner edge of the extensions 28 taper away from the center of the first half 12. The taper allows the extensions 28 to fit around objects of varying widths.

In the exemplary embodiment of the clip assembly 2, the second half 14 includes four stabilizing braces 30. The four stabilizing braces 30 are configured to impede the extensions 28 from moving along the x-y plane.

Figure 9:
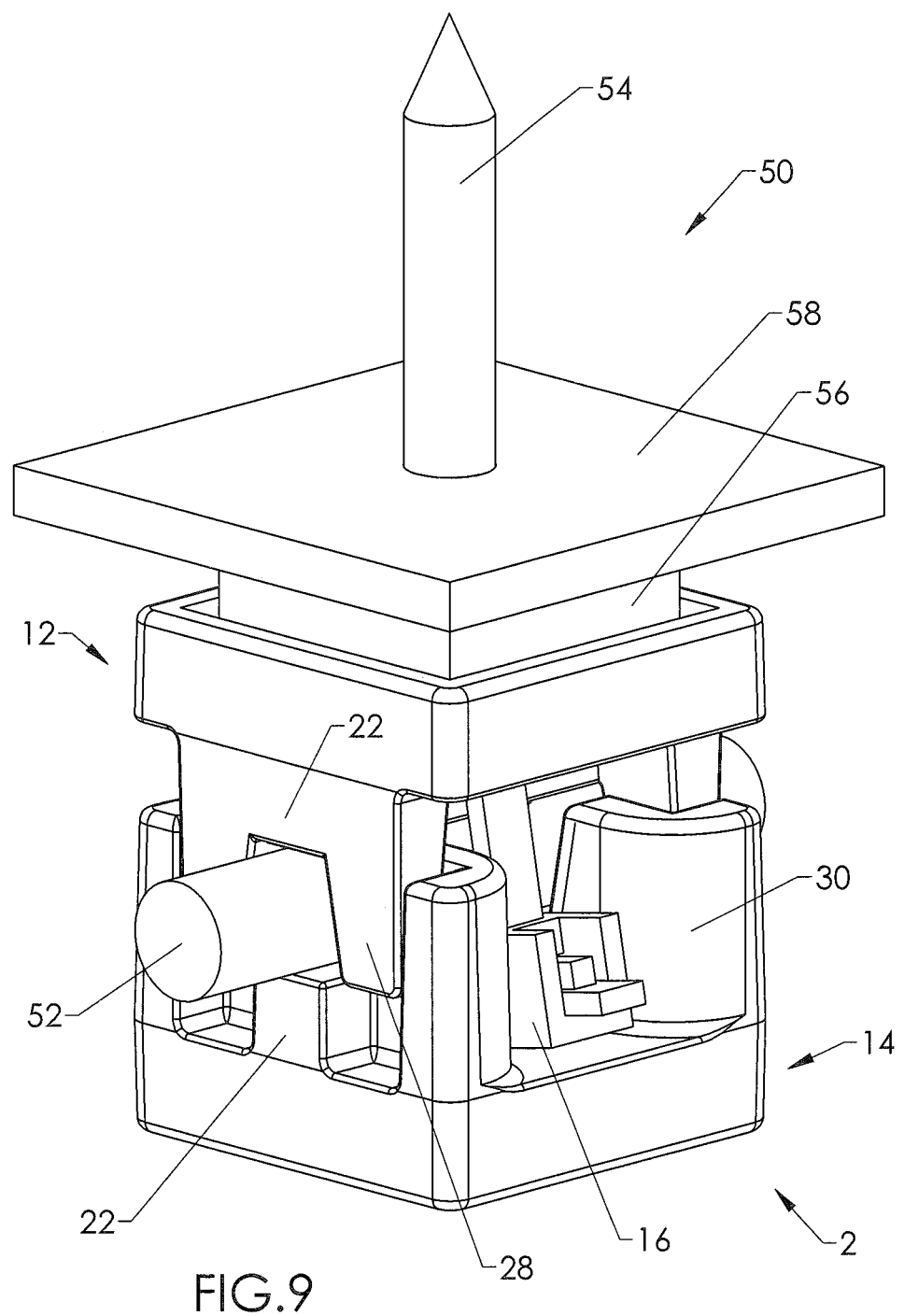
FIG. 9 illustrates an exemplary embodiment of a clip assembly connected to an exemplary embodiment of an anchor assembly.

FIG. 9 shows an exemplary embodiment of the clip assembly 2 connected to an exemplary embodiment of an anchor assembly 50. The clip assembly 2 is fastened to a strand of wire 52.

Figure 10:
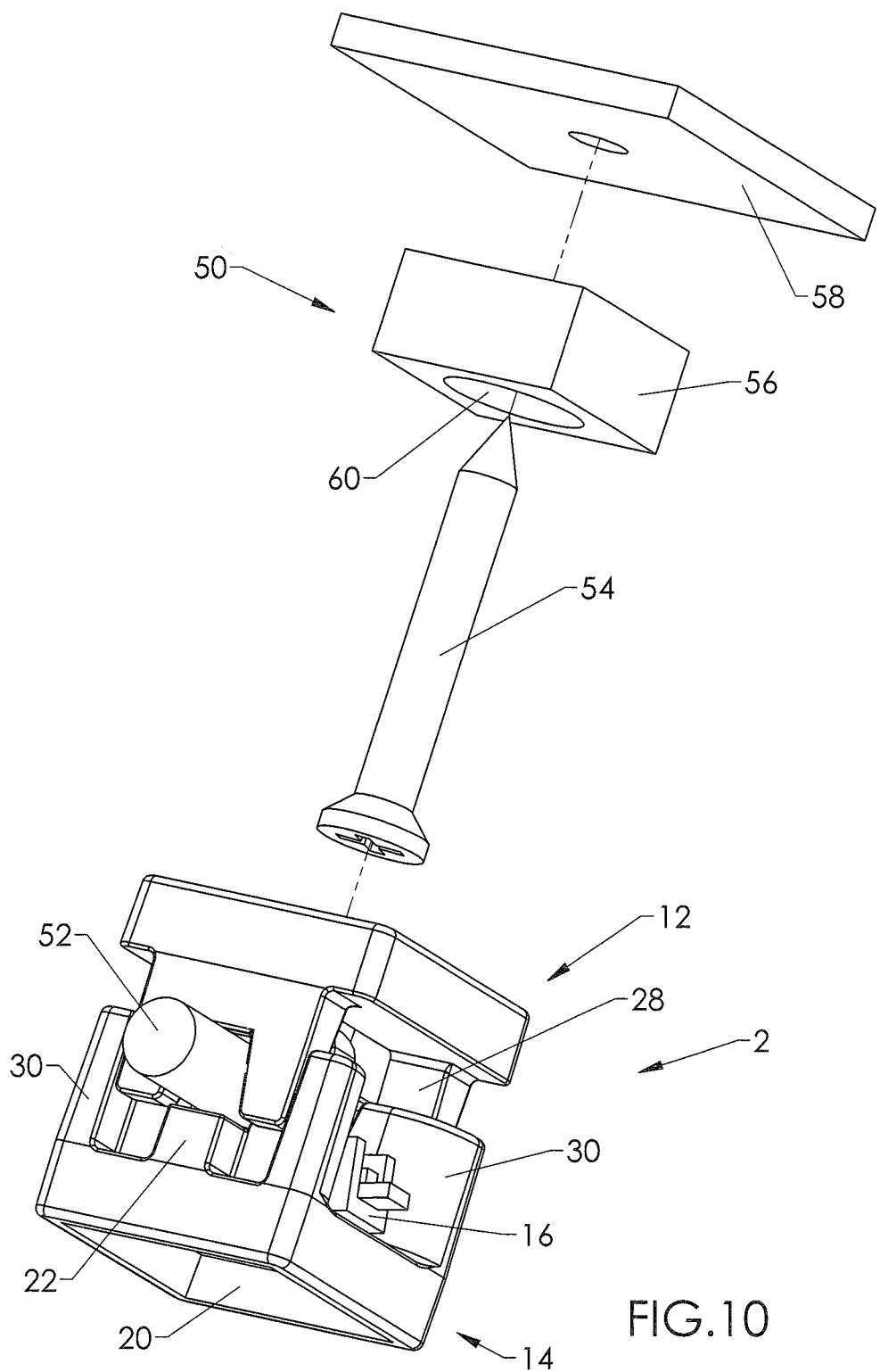
FIG. 10 illustrates an exemplary embodiment of a clip assembly and an exploded view of an exemplary embodiment of an anchor assembly.

FIG. 10 shows an exploded view of an exemplary embodiment of the anchor assembly 50 consisting of an affixing member 54 and an anchor magnet 56. In some embodiments, the anchor assembly 50 also includes a base member 58. In certain embodiments, base member 58 may be made out of any material. In contrast, current prior art requires elements similar to base member 58 to be ferromagnetic. The only ferromagnetic surface is metal and most building materials today are aluminum, pvc and stucco. Most roofs on a home/business have a fascia made of wood. The wood fascia, for protection from the elements, is usually covered with 4 different types of materials: metal, aluminum, PVC or stucco. Some homes leave the fascia wood exposed but this is becoming less common. In prior art, the affixing member 54 must pass through the covering material and engage into the wood fascia board, which is usually ½ inch to ¾ inch thick and varies in height. For example, the fascia is the structure typically gutters hang onto. Here, some embodiments are not limited to direct connection to the building's fascia; rather, the affixing member 54 can be engaged into a metal overhang or a concrete wall.

In some embodiments, the affixing member 54 is a screw that affixes the anchor magnet 56 and the base member 58 to a wall, structure, or other surface. In some embodiments, the anchor magnet 56 has a countersunk hole 60 so that when the affixing member 54 is a screw, the head of the screw is completely inside the anchor magnet 56. In other embodiments, the affixing member is a nail. In some embodiments, the anchor magnet 56 is meant to be permanently affixed to a structure, wall, or surface. In some embodiments, a semi-permanent adhesion device acts as an affixing member and affixes the anchor magnet 56 to a wall, structure, or other surface. In some embodiments, tape such as 3M® double-sided urethane foam tape is used. Using a semi-permanent adhesion device leaves no trace of a hole from a screw and works best on metal and aluminum surfaces or pre-treated vinyl surfaces. The semi-permanent adhesion device can generally adhere to adhere to metal, aluminum, PVC, plastic, sealed wood and sealed concrete and is effective as an anti-rotation mechanism. In some embodiments, the anchor magnet 56 is a N52 neodymium ½ inch×½ inch×¼ inch thick block. In some embodiments, the anchor magnet 56 is primed and painted with epoxy resin paint to match the color of the eave or vertical surface of the home or business. In some embodiments, the semi-permanent adhesion device is strong enough to be used without a screw such as affixing member 54.

FIG. 11 shows an exemplary embodiment of the clip assembly 2 fastened to a strand of wire 52 and connected to an exemplary embodiment of an anchor assembly 50. The anchor magnet 56 connects to one of the connection members 18 of the clip assembly 2. The anchor assembly 50 shown in FIG. 11 includes an exemplary embodiment of a safety-hook base 64. The safety-hook base 64 includes two hooking alms 66, each with a hooked portion 68. The hooking arms 66 shown in FIG. 12 are in an open position. FIG. 11 shows the hooking arms 66 in a safety position. In the safety position, the hooked portion 68 of the hooking aims 66 is positioned so that if the clip assembly 2 disconnects from the anchor assembly 50, the hooking arms 66 will catch the strand of wire 52 or other object. The hooking arms 66 are oriented so that when they are in the safety position, the hooked portions 68 hook from opposite sides of the strand of wire 52. In the open position, the hooking arms 66 are moved to the side of or above the strand of wire 52. The safety-hook base 64 includes two magnets 70. The two magnets 70 keep the hooking arms 66 in the open position until moved to a different position.

Figure 13:
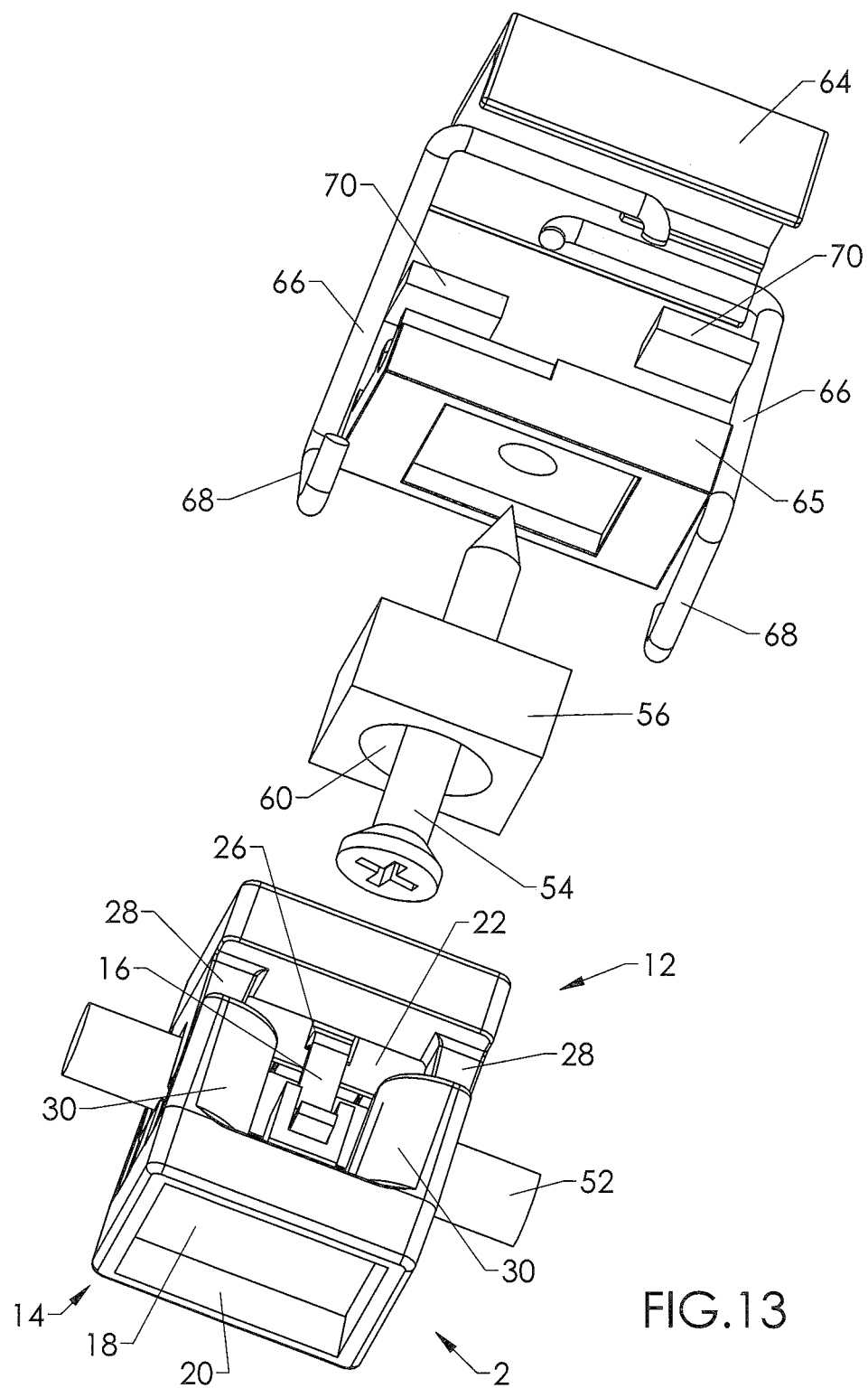
FIG. 13 illustrates an exemplary embodiment of a clip assembly and an exploded view of an exemplary embodiment of an anchor assembly with a safety hook base.

FIG. 13 shows an exemplary embodiment of a clip assembly 2 and an exploded view of an exemplary embodiment of an anchor assembly 50 that includes a safety-hook base 64.

Figure 14:
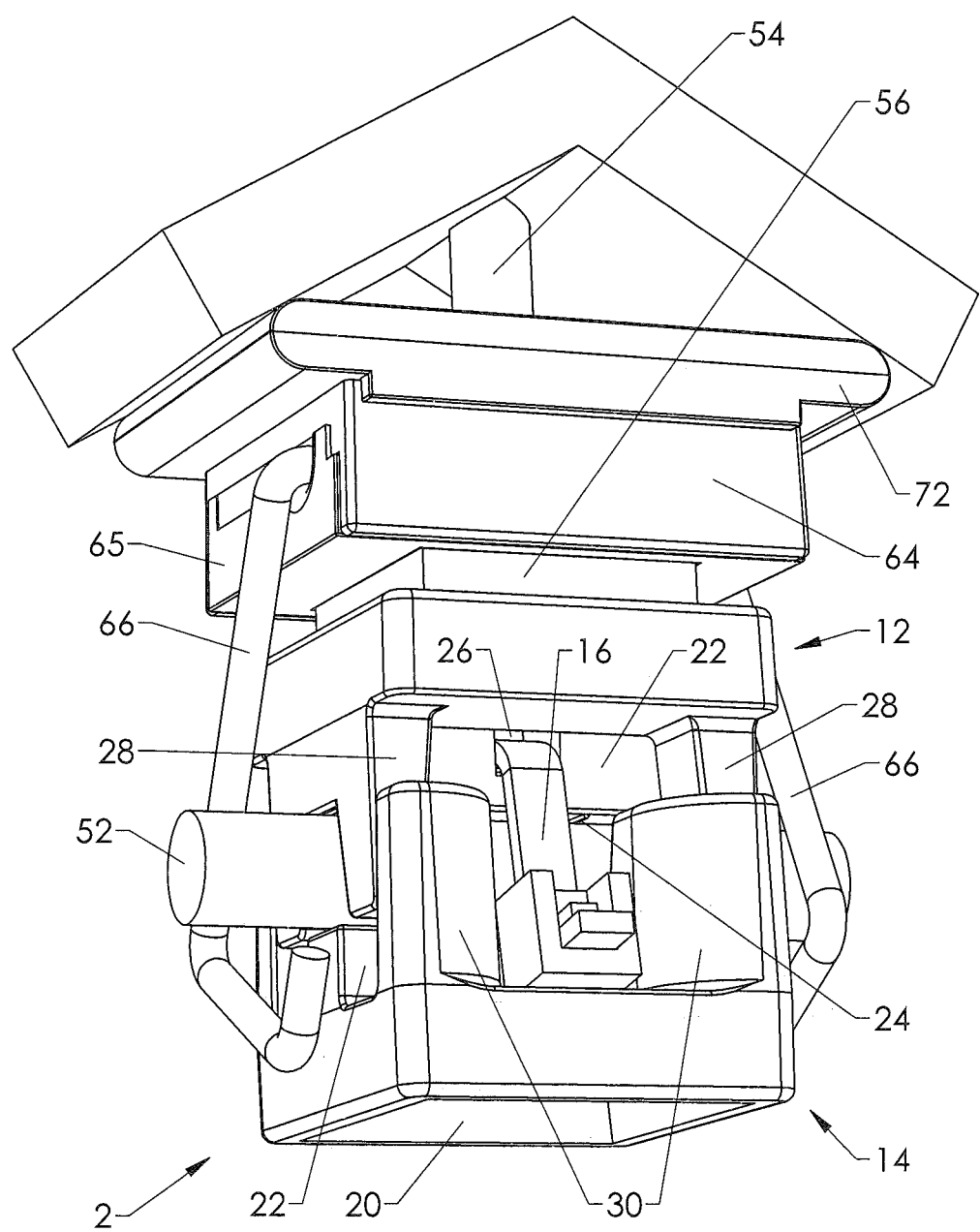
FIG. 14 illustrates an exemplary embodiment of a clip assembly connected to an exemplary embodiment of an anchor assembly with an exemplary embodiment of a safety-hook base and a peak base.

FIG. 14 shows an exemplary embodiment of the clip assembly 2 connected to an exemplary embodiment of an anchor assembly 50. The anchor assembly 50 shown in FIG. 14 includes an exemplary embodiment of a safety-hook base 64 and an exemplary embodiment of a peak base 72. The peak base 72 has rounded edges and is intended for use when affixing the anchor magnet 56 to a location where only the edges of the peak base 72 will be in contact with a solid surface.

Figure 15:
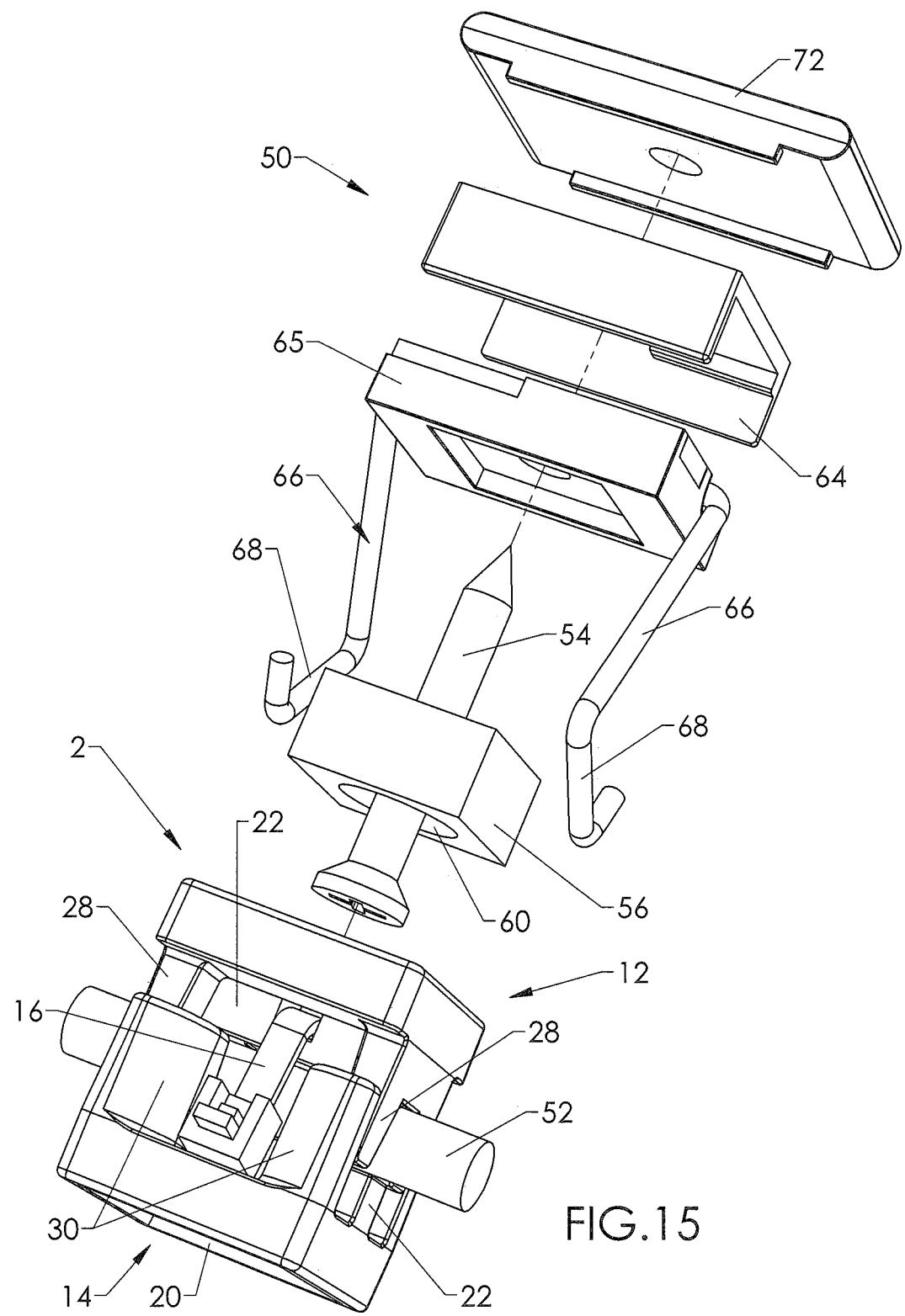
FIG. 15 illustrates an exemplary embodiment of a clip assembly and an exploded view of an exemplary embodiment of an anchor assembly with a safety hook and eve base.

FIG. 15 shows an exemplary embodiment of a clip assembly 2 and an exploded view of an exemplary embodiment of an anchor assembly 50. The exemplary embodiment of the anchor assembly 50 in FIG. 15 includes an exemplary embodiment of a safety-hook base 64 and an exemplary embodiment of a peak base 72.

Figure 16:
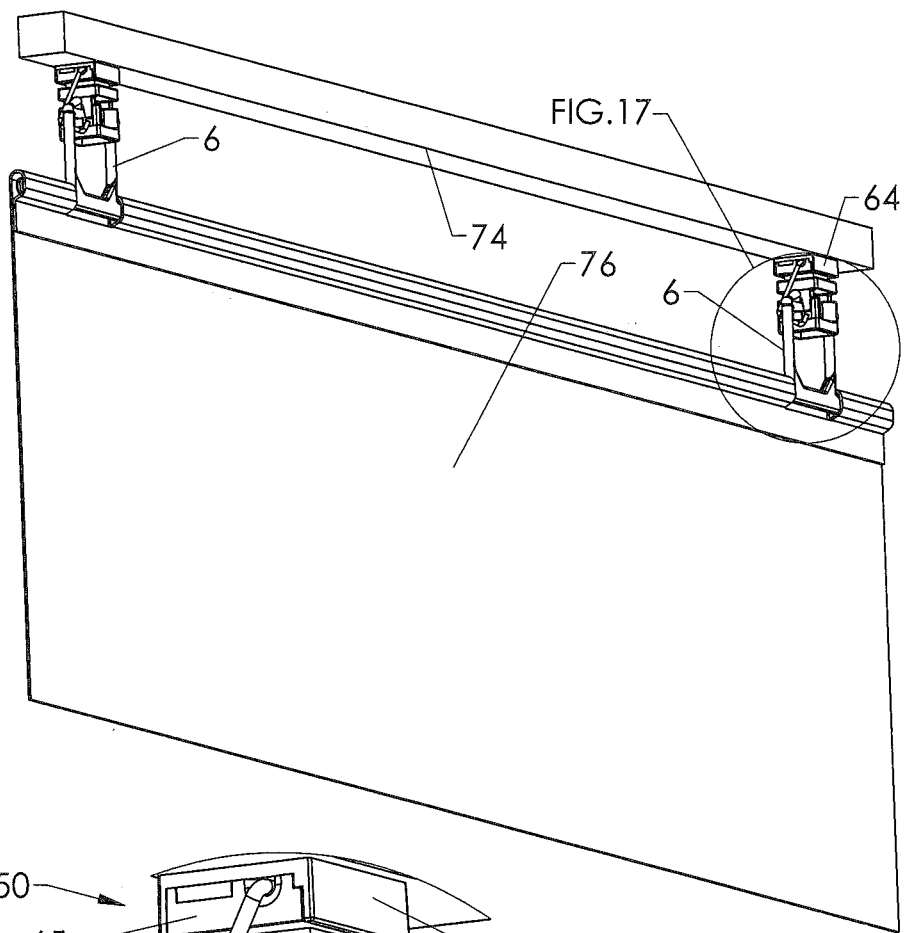
FIG. 16 illustrates the use of exemplary embodiments of clip assemblies and anchor assemblies to hang a banner from a structure.

FIG. 16 shows two exemplary embodiments of anchor assemblies 50 affixed to a surface 74 that is parallel with the ground. The anchor assemblies 50 include a safety-hook base 64. An exemplary embodiment of a clip assembly 2 is connected to each anchor assembly 50. Each clip assembly 2 is fastened to an exemplary embodiment of a banner hanger 6. The banner hangers 6 are embedded in a banner 76. In other embodiments, it is contemplated that banner hangers can be embedded in or connected to, for example, a flag, poster, drape, or shade. In certain embodiments, banner hangers 6 may be used inside buildings and connected to guy wires.

Figure 17:
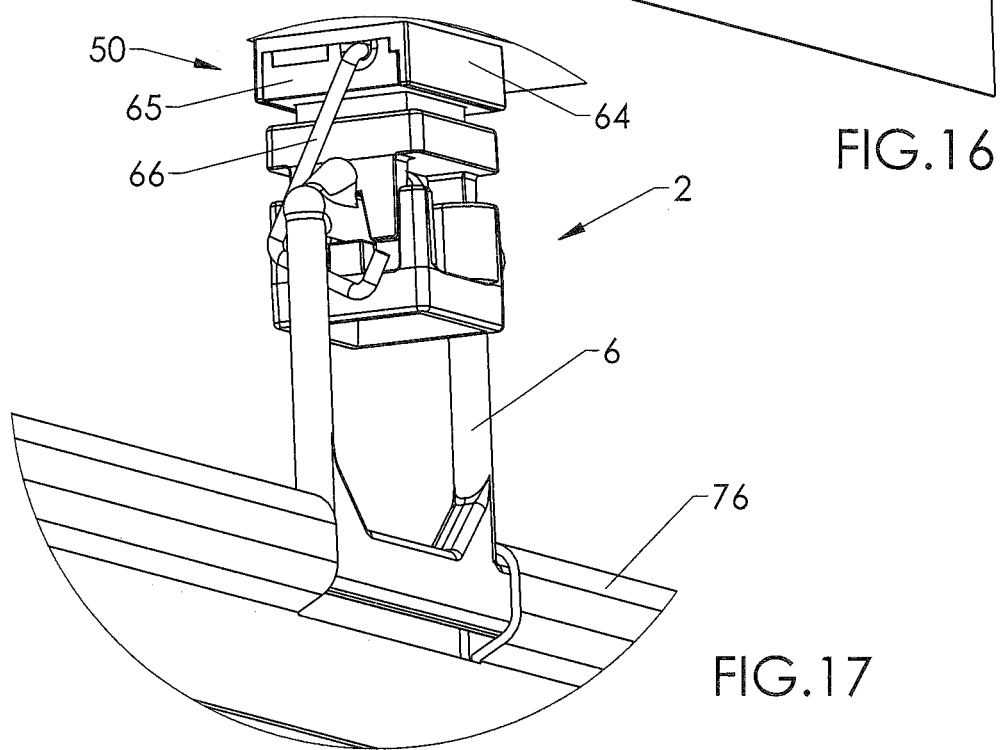
FIG. 17 illustrates a zoomed-in view of one of the clip assembly and anchor assembly sets shown in FIG. 16.

FIG. 17 is a close-up view of a portion of one of the banner hangers 6 shown in FIG. 16. FIG. 17 also shows the clip assembly 2 fastened to the banner hanger 6 and also shows the anchor assembly 50, including the safety-hook base 64. The hooking arms 66 of the safety-hook base 64 are in the safety position. Thus, if the clip assembly 2 were to disconnect from the anchor assembly 50, then the hooking arms 66 would catch the banner hanger 6 and prevent it from falling to the ground.

Figure 18:
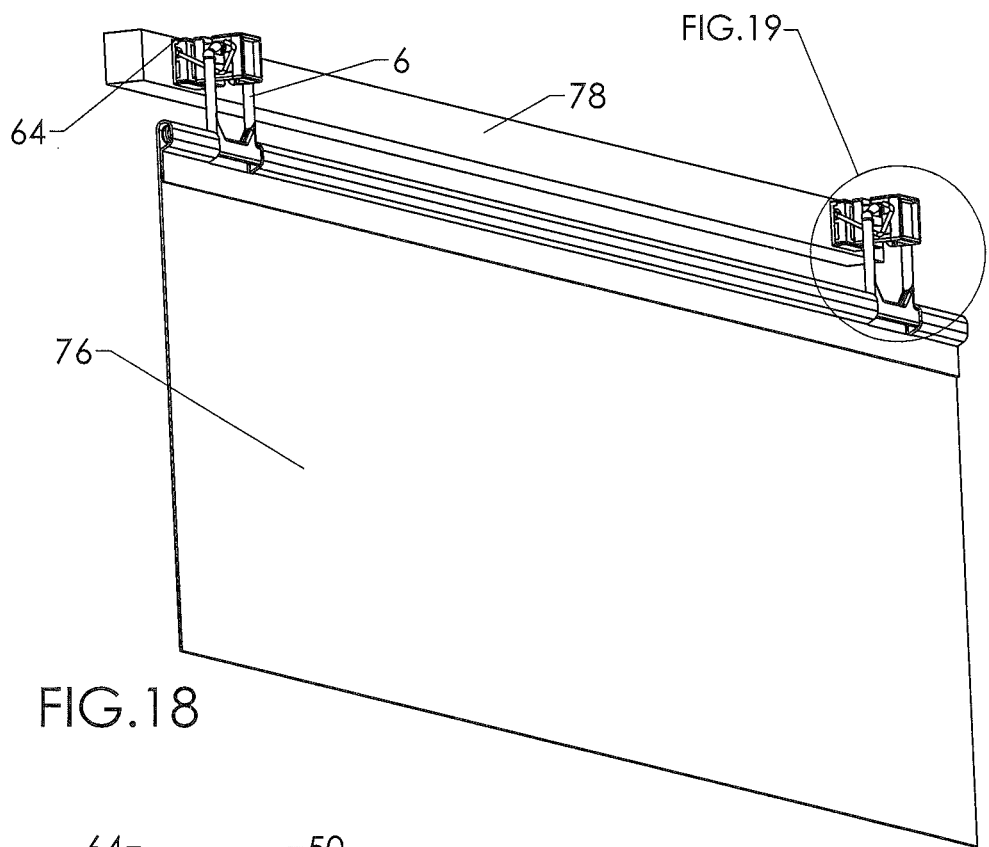
FIG. 18 illustrates the use of exemplary embodiments of clip assemblies and anchor assemblies to hang a banner from a structure.

FIG. 18 shows two exemplary embodiments of anchor assemblies 50 affixed to a surface 78 that is perpendicular with the ground. The anchor assemblies 50 shown include a safety-hook base 64. An exemplary embodiment of a clip assembly 2 is connected to each anchor assembly 50. Each clip assembly 2 is fastened around an exemplary embodiment of a banner hanger 6. In this exemplary embodiment, the banner hangers 6 are embedded in a banner 76. In other embodiments, it is contemplated that a banner hanger can be embedded in or connected to, for example, a flag, poster, drape, or shade.

Figure 19:
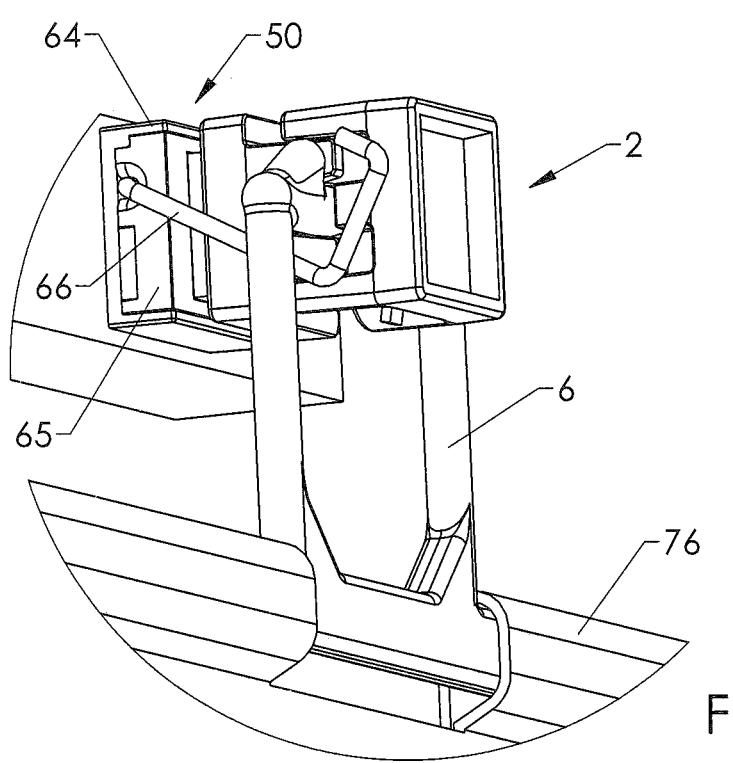
FIG. 19 illustrates a close-up view of one of the clip assembly and anchor assembly sets shown in FIG. 18.

FIG. 19 is a close-up view of one of the banner hangers 6 shown in FIG. 18. Also pictured are the clip assembly 2 and the anchor assembly 50. The hooking arms 66 of the safety-hook base 64 are positioned in the safety position.

FIG. 20 shows an exemplary embodiment of a mounting head assembly 100 attached to a pole 110. FIG. 21 shows an exploded view of FIG. 20. The mounting head assembly 100 includes a mounting head 101 and a mounting-head magnet 102. The mounting-head magnet 102 is meant to connect to at least one of the connection members 18 attached to the clip assembly 2. In some embodiments, the mounting-head magnet 102 is connected to one of the connection members 18 and the mounting head assembly 100 is then elevated so that the connection member 18 not connected to the mounting-head magnet 102 is connected to the anchor magnet 56. In some embodiments, the mounting-head magnet 102 is a 9 lb. neodymium magnet. In certain embodiments, the mounting-head magnet 102 is secured with an adhesive. In some embodiments, the mounting head 101 is configured to attach to an Unger telescopic pole. In some embodiments, the mounting head 101 has a wire remover hook 104 and trough 106. In some embodiments, the wire remover hook 104 is placed at a seventy (70) degree angle from the body (e.g. the pole 110). In some embodiments, the mounting head 101 has extensions 108 near the mounting-head magnet 102. The extensions 108 provide extra support and safety catches when placing wires. In some embodiments, a hump 105 of the mounting head assembly 100 is used.

Figure 22:
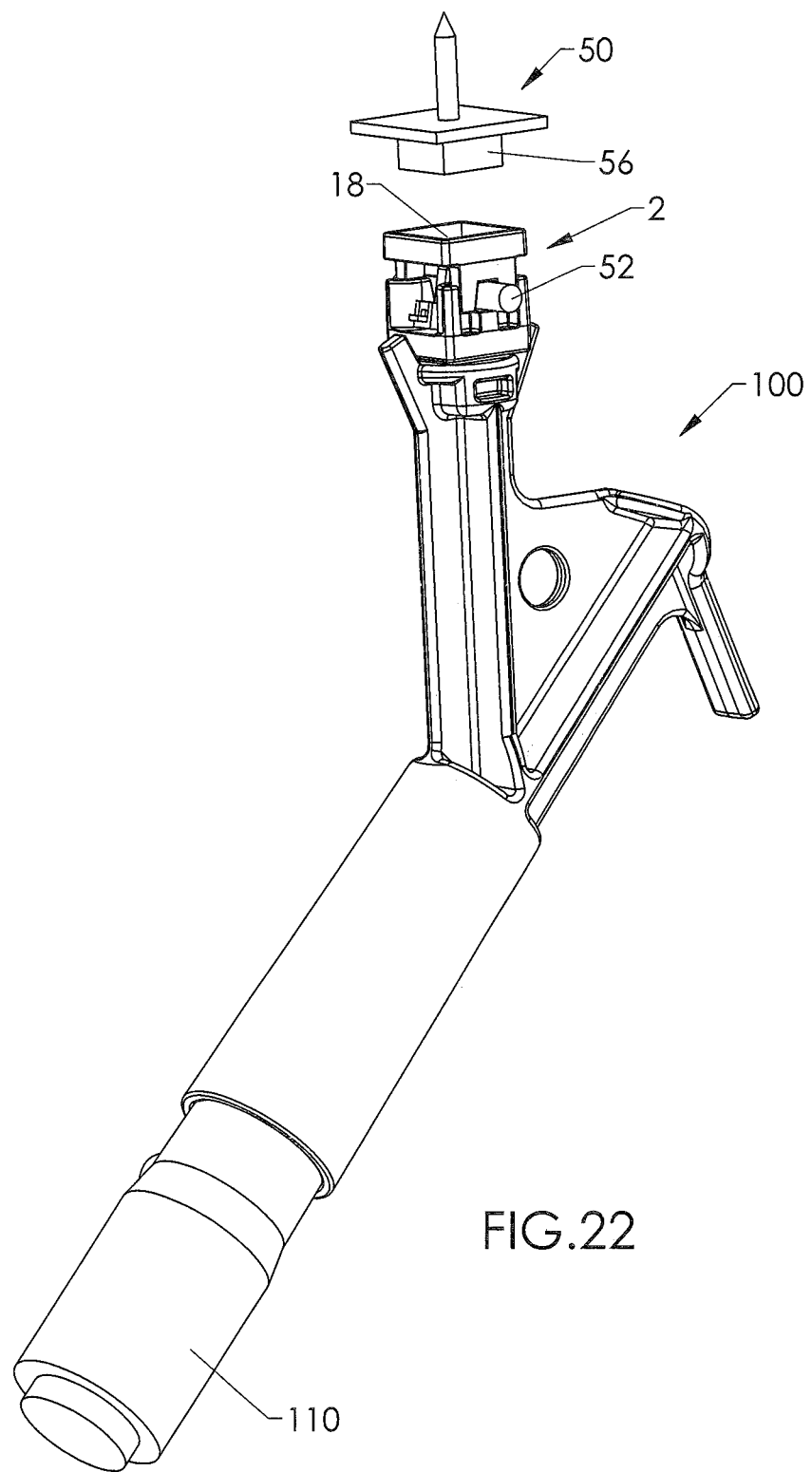
FIG. 22 illustrates an exemplary embodiment of a mounting head connected to an exemplary embodiment of a clip assembly with an exemplary embodiment of an anchor assembly also shown.

FIG. 22 shows an exemplary embodiment of a clip assembly 2 connected to an exemplary embodiment of a mounting head assembly 100. An anchor assembly 50 is also shown. When the clip assembly 2 is adjacent to the anchor assembly 50, the magnetic force exerted by the anchor magnet 56 on the connection member 18 of the clip assembly 2 overpowers the magnetic force exerted by the mounting-head magnet 102 on the other connection member 18 of the clip assembly 2. As a result, the clip assembly 2 can be connected to the anchor assembly 50 and detached from the mounting head assembly 100.

FIG. 23 shows a partial wall 130 and an eve 132 of a house. Exemplary embodiments of anchor assemblies 50 are mounted at regular intervals along the underside of the eve 132. An exemplary embodiment of a clip assembly 2 is connected to each anchor assembly 50. The clip assemblies 2 are fastened to a strand of lights 134. An exemplary embodiment of a mounting head assembly 100 connected to a pole 110 is shown near one of the clip assemblies 2.

FIG. 24 shows a close-up view of a portion of FIG. 23. The clip assembly 2 is fastened to an anchor assembly 50 that includes a safety-hook base 64. The mounting head assembly 100 is shown adjusting the position of a hooking arm 66.

FIG. 25 shows a partial wall 130 and an eve 132 of a house. Exemplary embodiments of anchor assemblies 50 are mounted at regular intervals along the underside of the eve 132. An exemplary embodiment of a clip assembly 2 is connected to each anchor assembly 50. The clip assemblies 2 are fastened to a strand of lights 134. An exemplary embodiment of a mounting head assembly 100 connected to a pole 110 is shown near one of the clip assemblies 2.

FIG. 26 shows a close up view of an exemplary embodiment of a clip assembly 2 connected to an exemplary embodiment of an anchor assembly 50. The clip assembly 2 is fastened to a strand of lights 134. The anchor assembly 50 is affixed to the eve 132 of a house.

Figure 27:
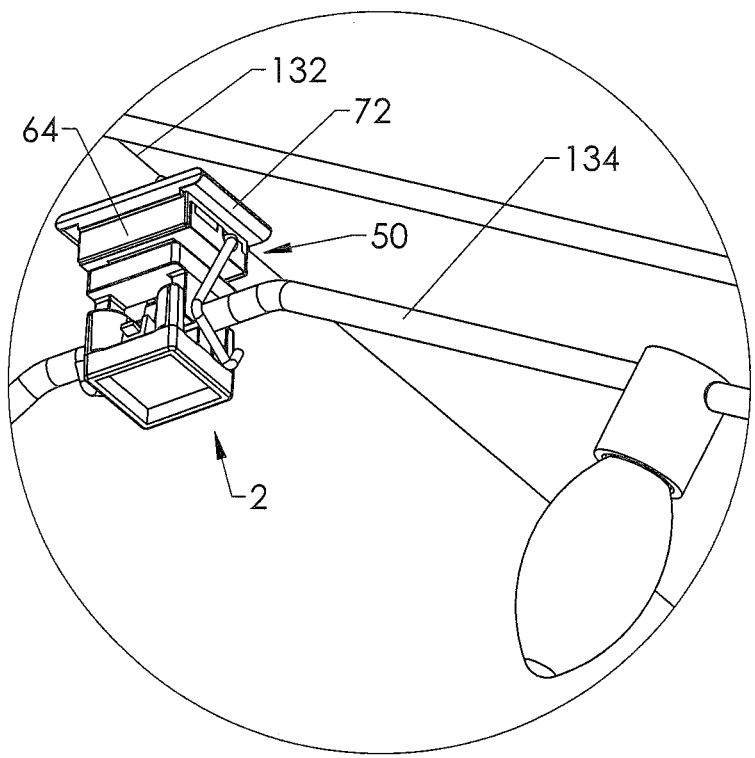
FIG. 27 illustrates a close-up view of a portion of FIG. 25.

FIG. 27 shows a close up view of an exemplary embodiment of a clip assembly 2 connected to an exemplary embodiment of an anchor assembly 50, which is affixed to the peak of the eve 132 of a house. The anchor assembly 50 includes a safety-hook base 64 and a peak base 72 and is affixed to the peak of the eve 132. The clip assembly 2 is fastened to a strand of lights 134.

Figure 28:
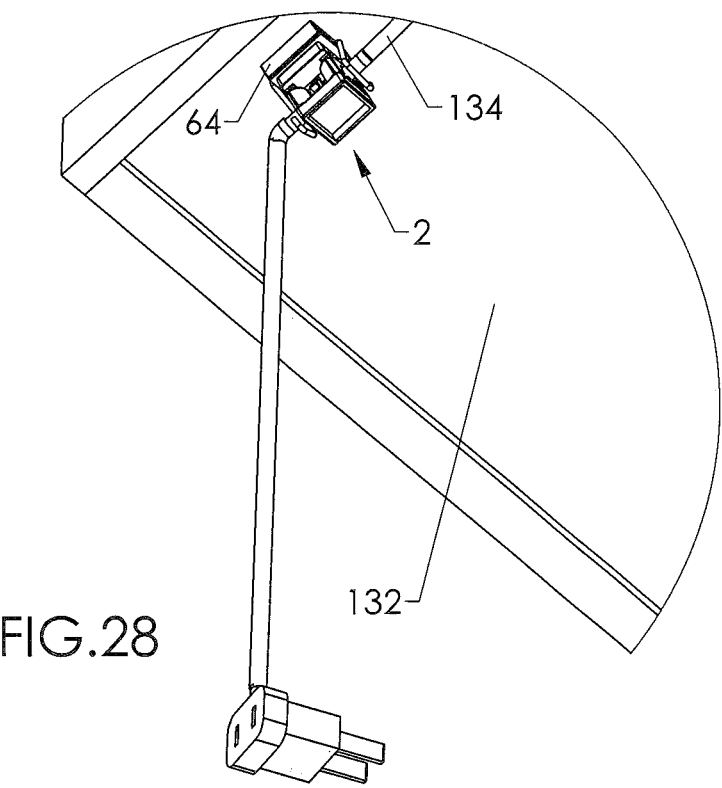
FIG. 28 illustrates a close-up view of a portion of FIG. 25.

FIG. 28 shows a close-up view of an exemplary embodiment of a clip assembly 2 connected to an exemplary embodiment of an anchor assembly 50, which is affixed to the eve 132 of a house. The clip assembly 2 is fastened to a strand of lights 134. Because an extension cord will be connected to the strand of lights, the anchor assembly 50 includes a safety-hook base 64.

FIG. 29 shows an exemplary embodiment of the mounting head assembly 100 and pole 110 being used to remove the strand of lights 134 from the underside of the eve 132 of a house. FIG. 30 shows a close up view of an exemplary embodiment of the mounting head assembly 100, showing the clip assembly 2, wire remover hook 104 and strand of lights 134, where wire remover hook 104 is securing strand of lights 134 and, as is shown in FIG. 29, is removing strand of lights 134 from the eve 132 of a house. The anchor assembly 50 is shown after the clip assembly 2 has been detached from it.

In some embodiments, wire remover hook 104 assists in getting down a string of lights or a banner. For example, in some embodiments, when a strand of lights 134 or a banner is being taken down, the mounting-head magnet 102 is facing away from the anchor magnet 56. In some embodiments, wire remover hook 102 is used for many purposes. In certain embodiments, mounting head magnet 102 helps to magnetically attract the metal in the clips when hanging up the strand of lights 134. This attraction makes grabbing onto the clip with the pole 110 easier.

Figure 31:
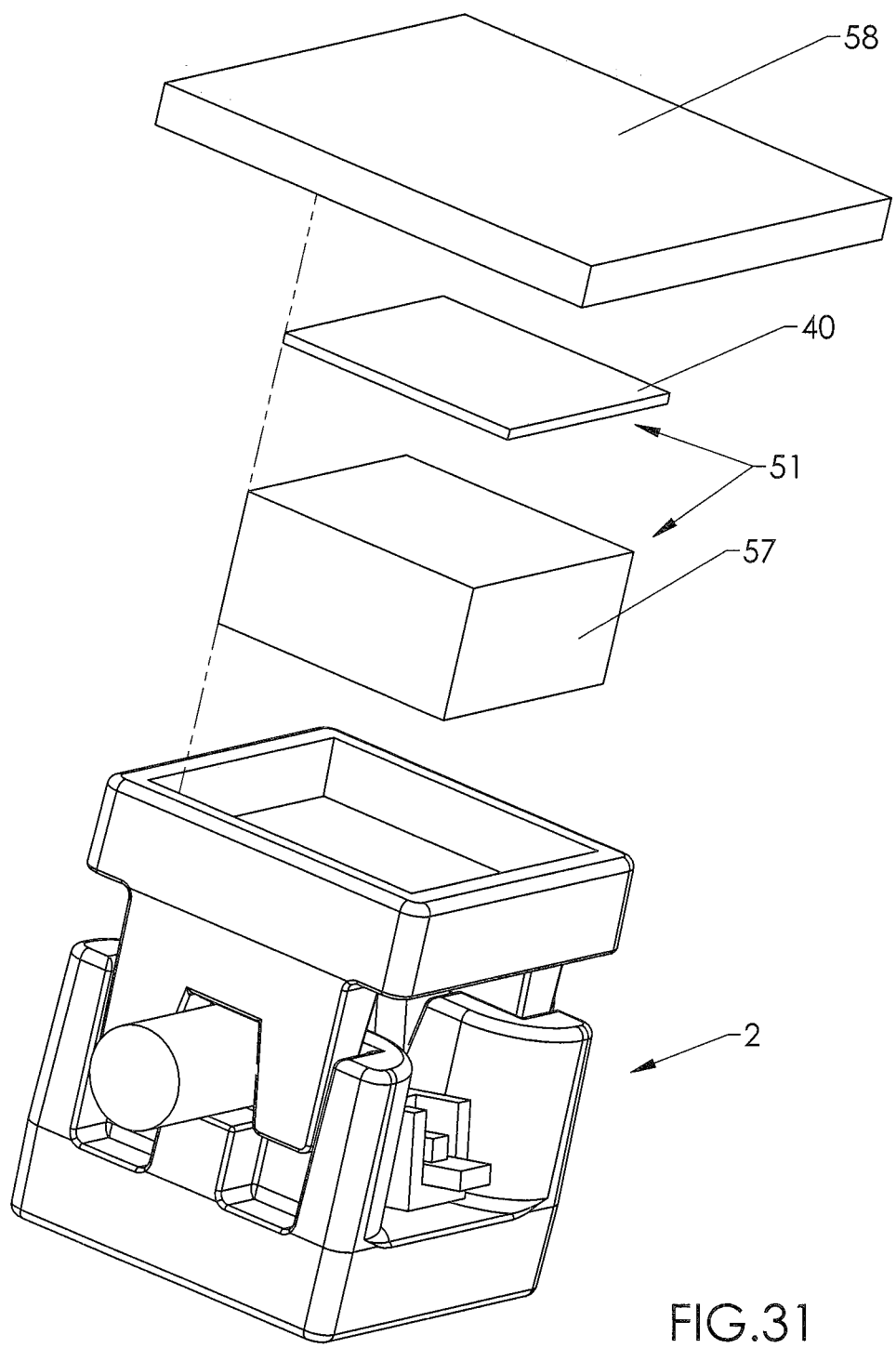
FIG. 31 illustrates an exemplary embodiment that shows an exploded view of anchor assembly.

FIG. 31 shows an alternate embodiment showing an exploded view of a tape and magnet assembly 51 consisting of double-sided tape 40 and a magnet 57. FIG. 31 also shows base member 58.

Figure 32:
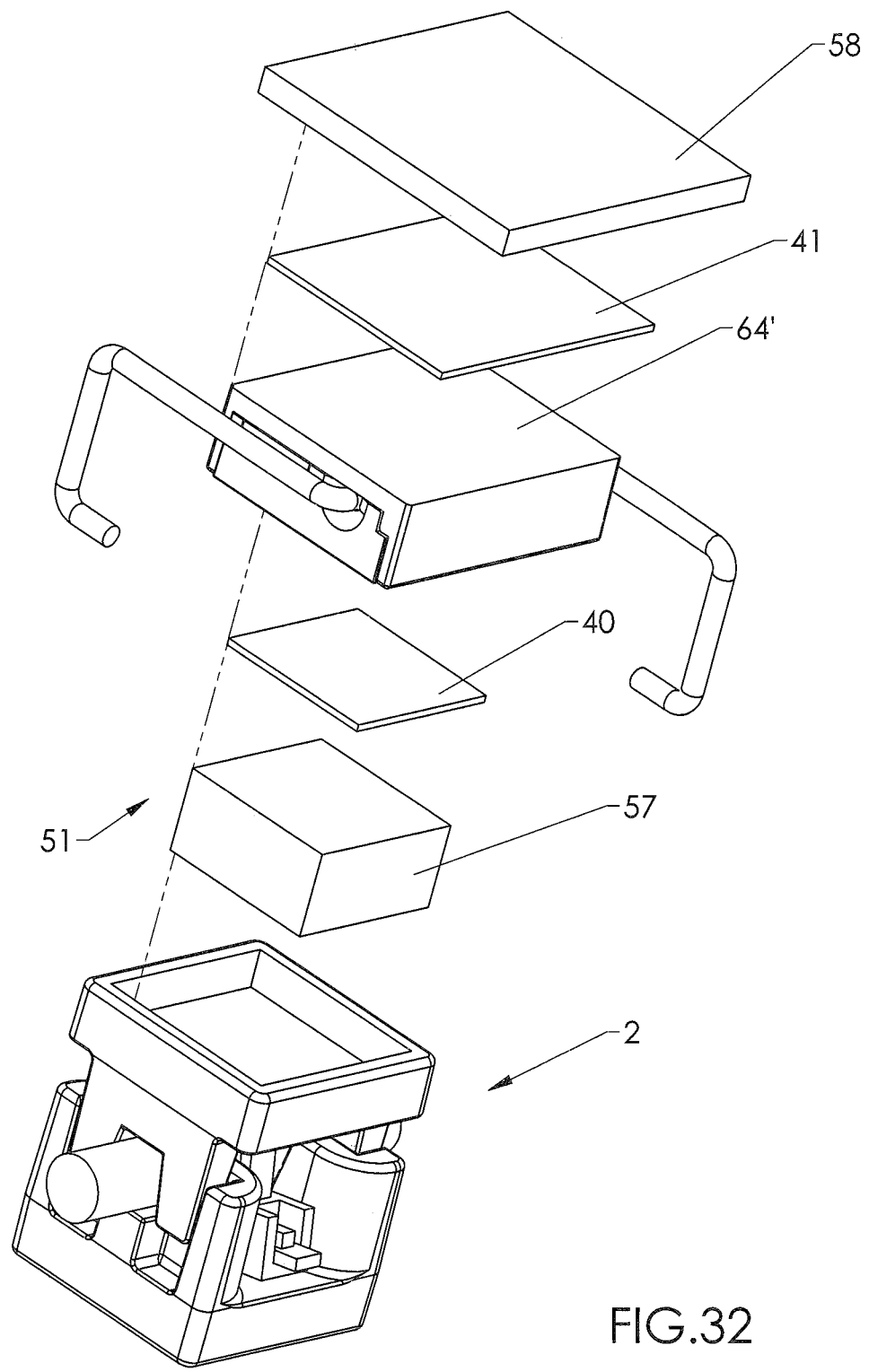
FIG. 32 illustrates an exemplary embodiment that shows an exploded view of anchor assembly.

FIG. 32 shows an exemplary embodiment that shows an exploded view of anchor assembly 50, double-sided tape 41 base member 58, and magnet assembly 51, which consists of double-sided tape 40 and a magnet 57.

Figure 32A:
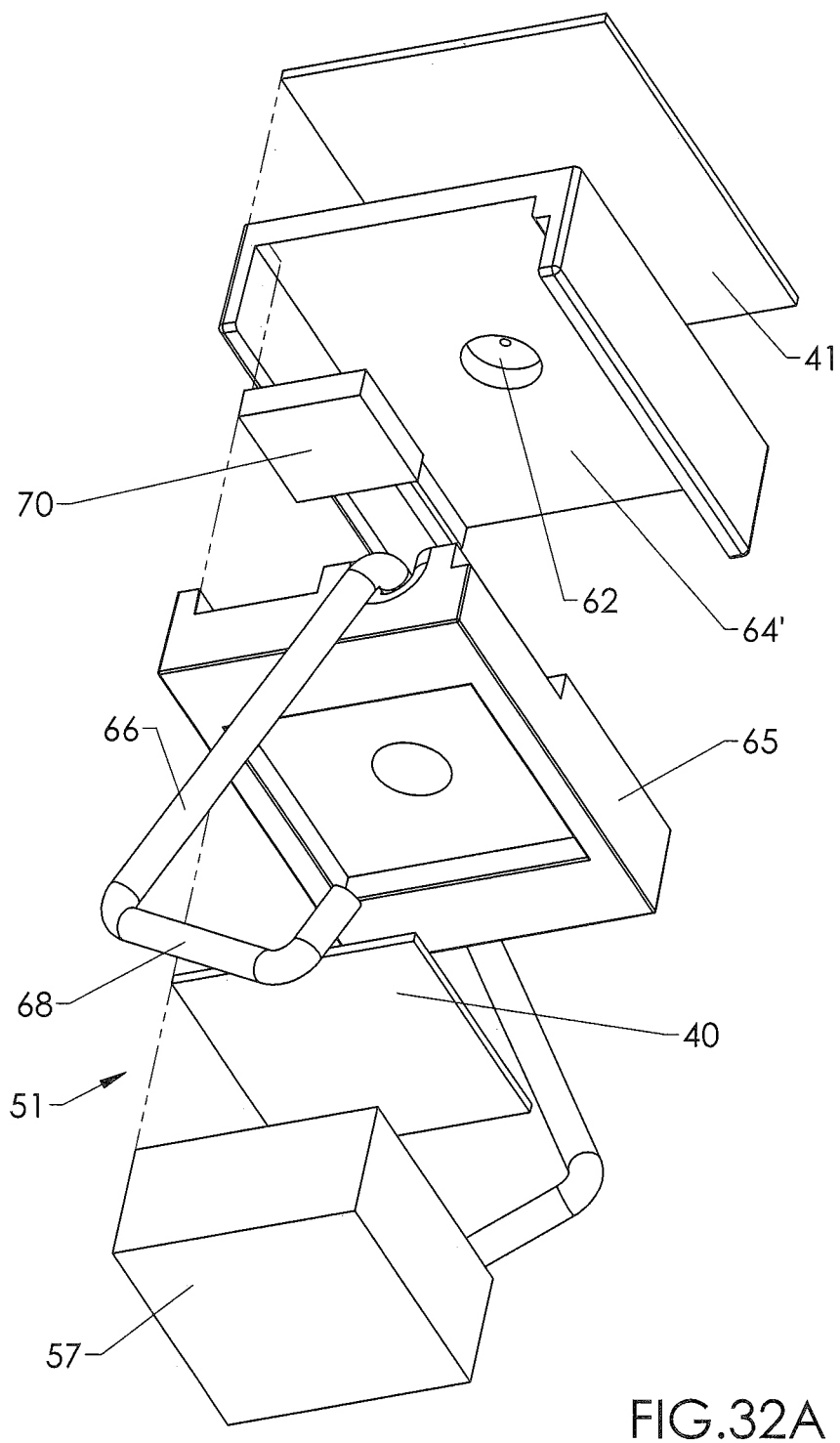
FIG. 32A illustrates an exemplary embodiment that shows an exploded view of magnet assembly 51.

FIG. 32A shows an exemplary embodiment that depicts an exploded view of magnet assembly 51 and includes safety hook base 65, safety-hook base cover 64' and hole 62.

In some embodiments, safety-hook base cover 64' prevents magnets, such as magnet 70, and hooking aims 66 from coming out. In some embodiments, safety-hook base cover 64' can be attached with a plastic adhesive. In other embodiments, safety-hook base cover 64' can be attached with a screw. In some embodiments when using the plastic adhesive, the adhesive is applied to the sides of the safety hook base 65 and the safety-hook base cover 64' is lowered down over the top which fuses the two pieces together. When using a screw, in some embodiments hole 62 would be used. In some embodiments, hole 62 has a thin plastic covering over the hole 62 through which the screw tears. In some embodiments, hole 62 has marks to help in centering the tip of the screw to help center it so that it can tear through the thin plastic.

Figures 33, 34, 35:
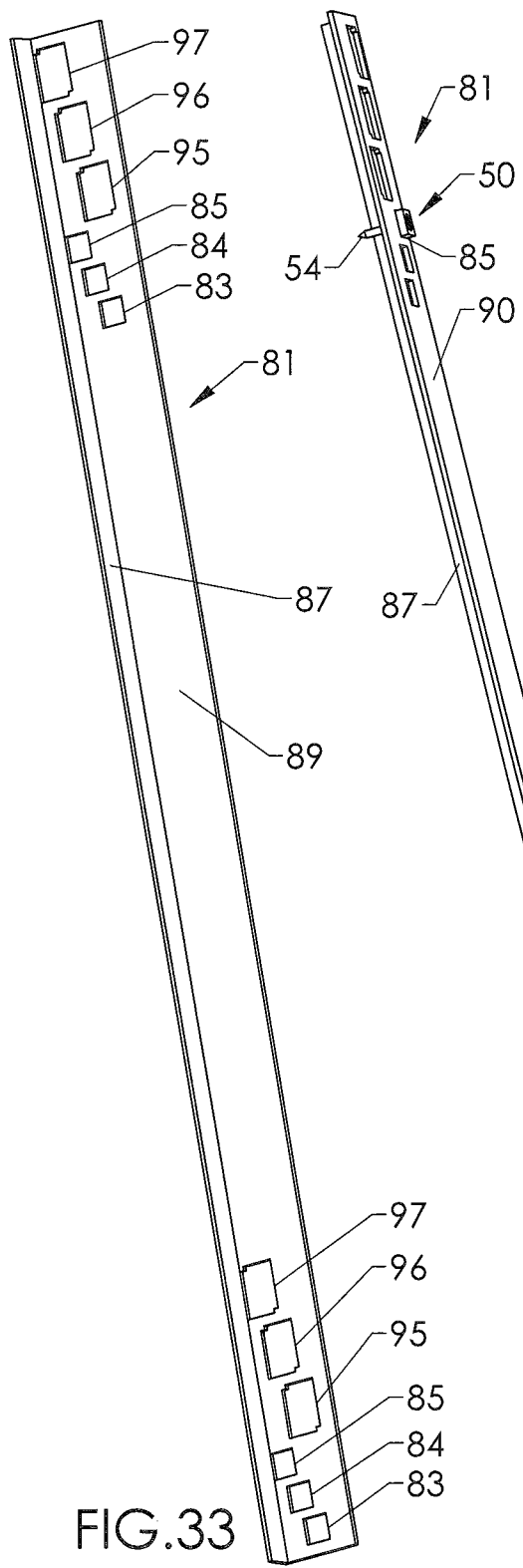
FIGS. 33, 34 and 35 illustrate different views of a ruler.

FIGS. 33, 34 and 35 show different views of a ruler 81. In some embodiments, ruler 81 has a far hole set 83, a middle hole set 84 and a close hole set 85. In some embodiments, ruler 81 has a larger far hole set 95, a larger middle hole set 96, and a larger close hole set 97. In certain embodiments, the ruler 81 is used to space anchor assemblies 50 an equal distance away from each other as well as an equal distance from the edge of the facia board. In some embodiments, the far hole set 83 is used to mount anchor assembly 50 furthest from the facia board's edge and the close hole set 85 is used to mount the anchor assembly 50 closest to the facia board's edge. In some embodiments, ruler 81 has a narrow inside alignment surface 87, a narrow outside alignment surface 88, a wide inside alignment surface 89 and a wide outside alignment surface 90.

FIGS. 34 and 35 show an exemplary embodiment where two of the anchor assemblies 50 are mounted in close hole set 85.

FIG. 36 shows an exemplary embodiment where ruler 81 is used to space and mount anchor assemblies 50 in the close hole set 85 and shows narrow outside alignment surface 88 and wide outside alignment surface 90. FIG. 36 also shows ruler 81 in relation to a soffit area of an eave 91 and to a facia area of an eave 93.

FIG. 37 is a close up view of the exemplary embodiment shown in FIG. 36 also showing the anchor assembly's 50 affixing member 54 and the anchor magnet 56. After the anchor assemblies 50 shown in FIGS. 36 and 37 are fastened in place, ruler 81 will be moved down so that other anchor assemblies 50, if desired, can be placed in other positions. For example, in some embodiments, two magnets (e.g. magnet 56) are secured with the help of ruler 81. Once the initial two magnets (e.g. magnet 56) are secured in place, ruler 81 is moved off the two magnets 56. To help position the next magnet and so forth, ruler 81 is placed over only one of the previously secured magnets so that ruler 81 helps the user to measure the placement of the next magnet. This process helps to maintain uniformity for esthetics and hanging instant-up banners, Christmas lights, flags and decorations.

FIG. 38 shows an exemplary embodiment where ruler 81 is used to space and mount magnet assembly 51 with magnet 57 in the close hole set 85 and shows narrow outside alignment surface 88 and wide outside alignment surface 90. FIG. 38 also shows ruler 81 in relation to the soffit area of the eave 91 and to the facia area of the eave 93. FIG. 39 is a close up view of the exemplary embodiment shown in FIG. 38, also showing the magnet assembly's 51 magnet 57.

FIG. 40 shows an exemplary embodiment where ruler 81 is used to install a affixing member 54 on anchor assembly 50 and to install the tape 40 (not shown) on the soffit area of the eave 91. FIG. 40 also shows magnet assembly 51 including anchor magnet 56 and magnet 57. FIG. 40 also shows ruler 81 in relation to a soffit area of an eave 91 and to a facia area of an eave 93.

FIG. 41 is a close up view of this exemplary embodiment also showing inside alignment surface 87 and wide inside alignment surface 89.

Figures 42, 43:
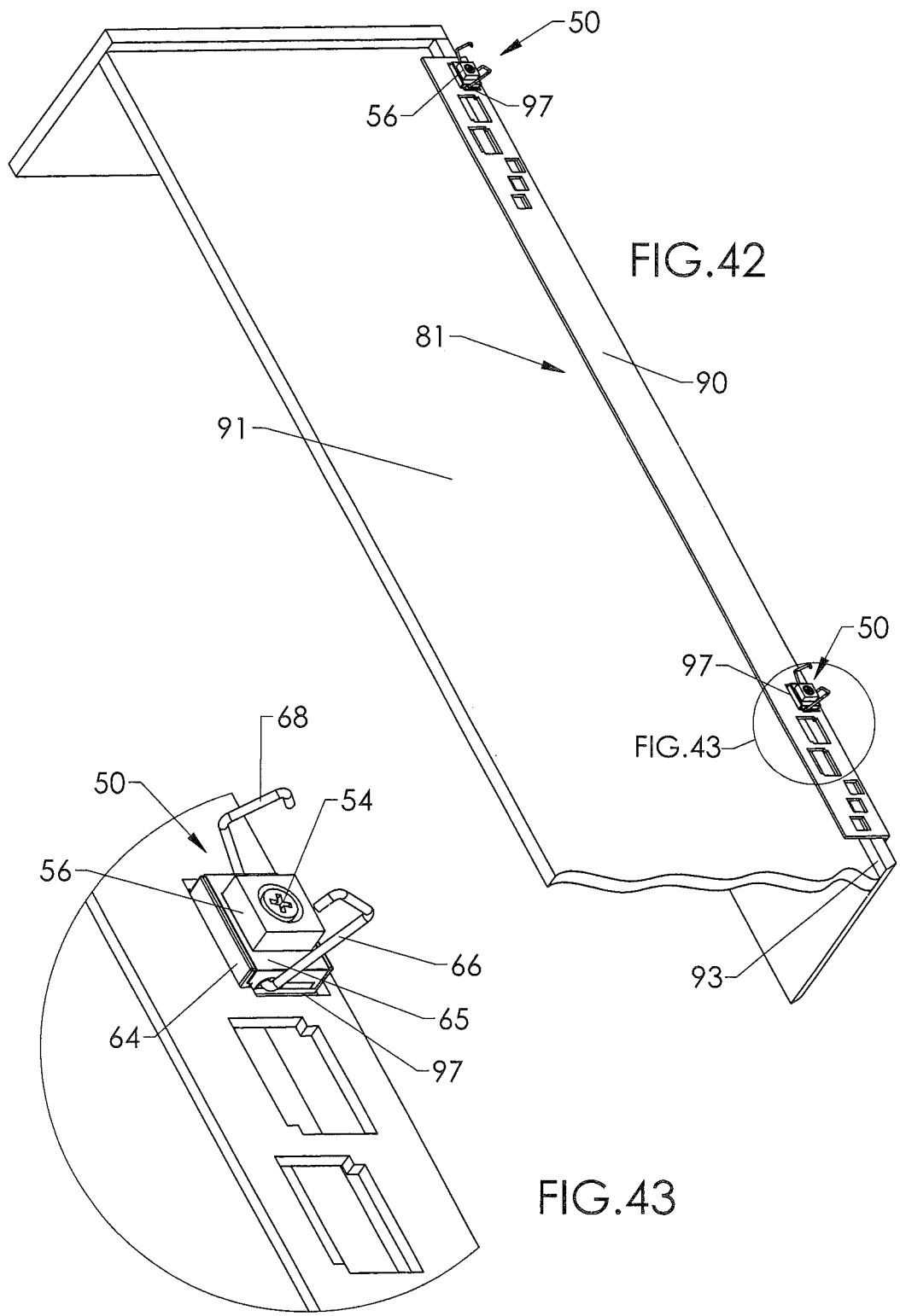
FIG. 42 illustrates an exemplary embodiment where anchor assembly is located in and aligned with larger close hole set of ruler.
FIG. 43 illustrates a close up view of an exemplary embodiment where anchor assembly is located in and aligned with larger close hole set of ruler.

FIG. 42 shows an exemplary embodiment where anchor assembly 50 is located in and aligned with larger close hole set 97 of ruler 81.

FIG. 43 is a close up view of this exemplary embodiment where anchor assembly 50 is located in and aligned with larger close hole set 97 of ruler 81.

FIG. 44 shows an exemplary embodiment where anchor assembly 50 is located in and aligned with larger middle hole set 96, and where magnet assembly 51 is located in and aligned with larger far hole set 95.

FIG. 45 is a close up view of this exemplary embodiment where anchor assembly 50 is located in and aligned with larger middle hole set 96.

FIG. 46 is a close up view of this exemplary embodiment where magnet assembly 51 is located in and aligned with larger far hole set 95.

FIG. 47 shows an isometric view showing banner 76 suspended from eave 74 and showing five anchor assemblies 50 for potential attachment to five banner hangers 6 and clip assemblies 2. The embodiment shown uses two spine clip assemblies 115. In some embodiments, the spine clip assemblies 115 help to prevent the wind from twisting the banner 76 ends loose from the hooking aims 66.

FIG. 48 is a close up view of a portion of FIG. 47 showing the two hooking arms 66 and anchor magnet 56.

FIG. 49 shows an embodiment with banner 76 fully installed.

FIG. 50 shows a close-up view of a portion of FIG. 49, showing more detail of the left side of the banner 76 and how the mounting head assembly 100 is positioned in a loop hole 116. The hump 105 (as shown in FIGS. 20-21) of the mounting head assembly 100 is placed inside the loop hole 116. This also shows a view of how banner 76 is fastened to the spine clip assembly 116. In some embodiments, a banner seam 77 can be a melted iron on seam or other method of attachment.

FIG. 51 shows a close-up view of the right side of the banner 76 that also shows close-up views of the spine assembly 115 and spine clip loop hole 116.

FIG. 52 illustrates a shortened banner 76 section with banner hangers 6, spine clip assembly 115 and banner hanger t arm 7.

FIG. 53 shows a close up view of the left side of FIG. 52 and includes a banner hole 75, which is used to feed the banner hanger 6 through. In this embodiment, the banner hole 75 is slightly larger than the banner hanger 6 to allow some lateral movement to compensate for mounting inaccuracies.

FIG. 54 is a left end view of FIG. 52. It shows the spine clip assembly 115 in a slightly spread position to allow the banner hanger 6 to fit inside. In some embodiments, this creates a spring pressure to grip the banner hanger 6 and force it up and to the center of the spine clip assembly 115 preventing it from flopping around. This embodiment also shows a clamped spine clip position 117. This embodiment further shows the widened spacing between the spine clip loop holes 116.

FIG. 55 is a right end view of FIG. 52. It is similar to FIG. 54 but it shows the entire edge of the banner 76 and how it hooks together. A looped end 73 of the banner 76 wraps around the spine clip assembly 115 and banner hanger 6.

FIG. 56 is an isometric view of the spine clip assembly 115 and two banner hangers 6.

FIG. 57 shows a close up view of the spine clip assembly 115, including a hole in the spine clip 119 that allows the banner hanger 6 to protrude. In some embodiments, the hole in the spine clip 119 is slightly larger than the banner hanger 6 protrusion to allow some lateral movement to compensate for mounting inaccuracies.

FIG. 58 is an isometric view of the spine clip assembly 115 shown in a closed or relaxed state.

FIG. 59 is a left end view of FIG. 58 that shows a closed or relaxed state of the spine clip assembly 118, also showing the spine clip loop holes 116 being closed together.

Figure 60:
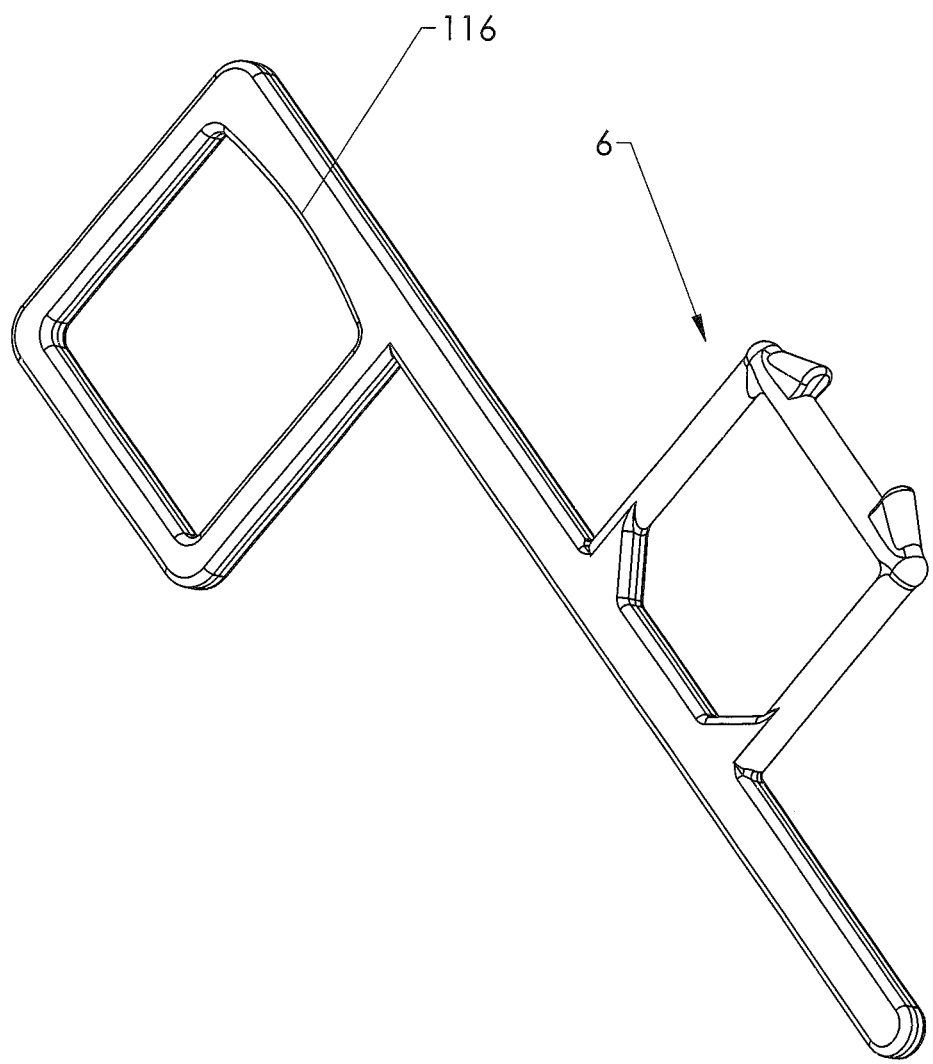
FIG. 60 illustrates an embodiment where the spine clip loop hole and the banner hanger are separated from the spine.

FIG. 60 shows an embodiment where the spine clip loop hole 116 and the banner hanger 6 are separated from the spine 115.

Figure 61:
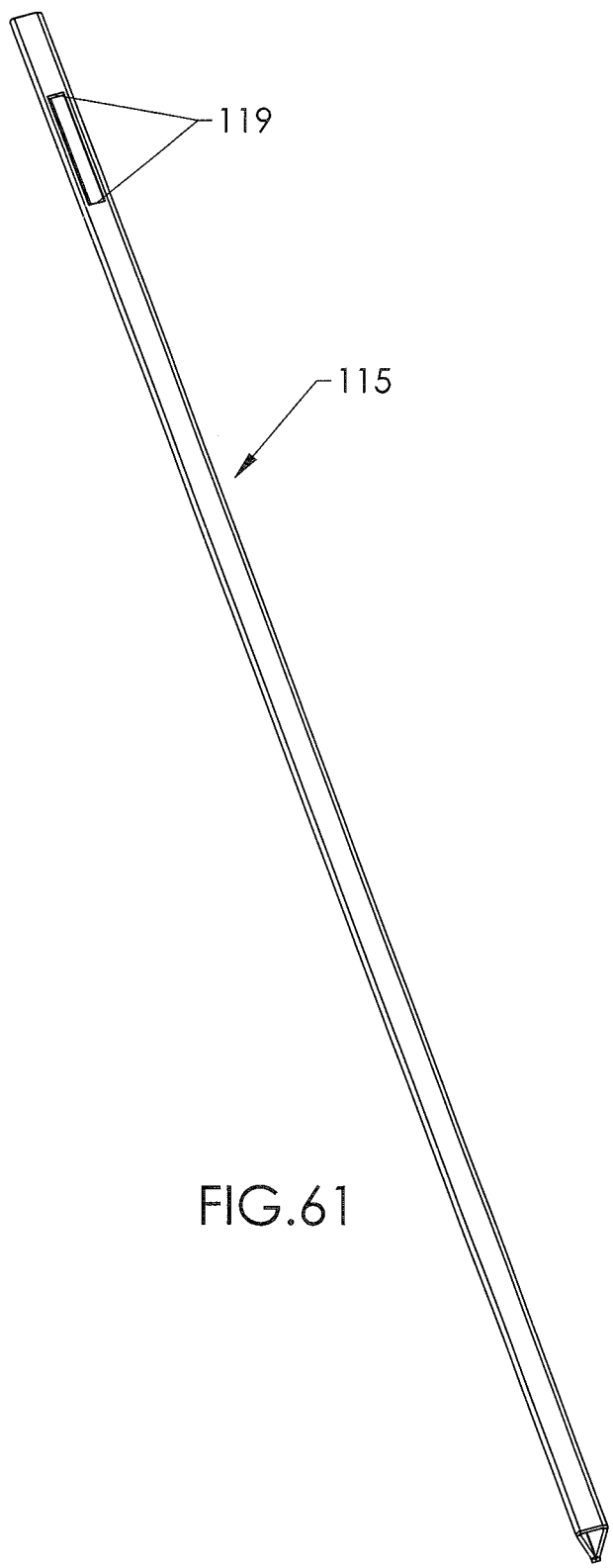
FIG. 61 illustrates an embodiment where the spine clip loop hole and the banner hanger are not connected to the spine.

FIG. 61 illustrates an embodiment where the spine clip loop hole 116 and the banner hanger 6 are not connected to the spine 115. This figure also illustrates hole in the spine clip 119.

Figure 62:
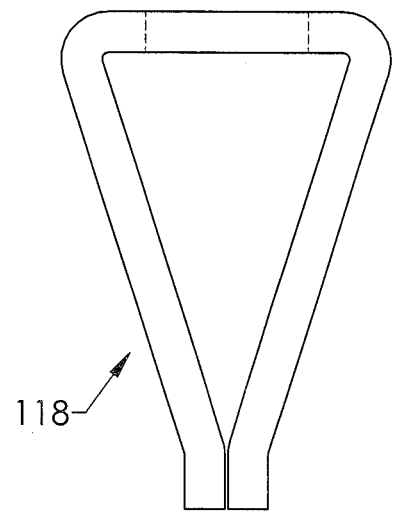
FIG. 62 illustrates a left end view of FIG. 61 that shows a closed or relaxed state of the spine clip assembly.

FIG. 62 is a left end view of FIG. 61 that shows a closed or relaxed state of the spine clip assembly 118.

FIG. 63 is an isometric view of the spine clip assembly 115 and two banner hangers 6, where the banner hangers 6 and spine clip loop hole 116 have been connected to the spine clip assembly 115 but can be detached.

FIG. 64 is an isometric view of the spine clip assembly 115 showing two banner hangers 6 that can be detached and also shows banner 76.

FIG. 65 shows a close up view of the spine clip assembly 115 where the banner hanger 6 and spine clip loop hole 116 can be separated from the spine clip assembly 115. This figure also shows banner 76.

In some embodiments, the mounting-head magnet 102 attracts the metal in the clip strong enough to hold the weight of the strand of lights 134 all by itself. In certain embodiments, the anchor assembly 50 together with the wire remover hooks 104, are important for the initial start. When the strand of lights 134 is positioned on the anchor magnet 56, it will hold the strand of lights 134 in place with all the weight long enough until the user lowers down one or both of the anchor assembly hooks (for "anchor assembly hooks" see FIG. 11 or 14 and hooking arms 66 and hooked portion 68). The anchor assembly hooks will secure the clip assembly 2 in place while the user manipulates the remaining clips up to their respective anchor magnets. In some embodiments, the anchor assembly wire hooks may be used in 3 locations on a home if they are placing Christmas lights. These locations would be your starting location, roof peeks and ending location, where you would have a dangling wire to an outlet.

A method for supporting objects such as Christmas lights, holiday decorations, banners, flags, signs, drapes, and curtains on a building, wall, or other structure and placing and removing those objects without the repeated use of a ladder may, according to some embodiments, include affixing at least one anchor magnet to a building, wall, or other structure. In some embodiments, the method includes affixing more than one anchor magnet. In some embodiments, the method includes affixing anchor magnets at regular intervals, such as every two feet. In some embodiments, a placement guide is used to ensure the anchor magnets are placed at regular intervals. In some embodiments, at least one of the anchor magnets will be connected to a safety-hook base and/or a peak base.

In some embodiments, the method may also include fastening at least one clip assembly to an object. In some embodiments, the method includes fastening more than one clip assembly to the object at the same intervals as the anchor magnets are affixed to the structure. In some embodiments, the object is a strand of lights. In other embodiments, the object is a banner hanger. In other embodiments, the object is garland, string, rope, pennant string, a hook, a rod, or a strand of beads.

In some embodiments, the method includes attaching a mounting head assembly to a pole or other device that can be used to raise the mounting head assembly to heights that a person cannot reach without the use of a ladder or stool. In some embodiments, the method includes connecting the mounting-head magnet to one of the connection members on a clip assembly. The method may include using the mounting head and pole to raise the clip assembly toward an anchor assembly, placing the clip assembly's other connection member adjacent to the anchor magnet, connecting the connection member to the anchor magnet, and pulling the mounting-head magnet away from the clip assembly while the clip assembly remains connected to the anchor assembly. The method may include repeating this process for each clip assembly fastened to the object. In some embodiments, the method includes using the wire remover hook to remove the string of lights or banner.

For example, in some embodiments, to get the clip off of the anchor assembly, you position the clip back onto the anchor magnet using the mounting head to nudge it. The power of the magnet will attract the clip back into position (see FIG. 11). Once the clip is back on the anchor magnet and off of the wire hooks, using the wire remover hook, you rotate the hooks up (FIG. 12). In some embodiments, the smaller magnet in the anchor assembly securely holds the wire hooks up and out of the way (FIG. 12). Using the wire remover hook, you disengage the clip from off the magnet and the string of lights or banner comes down (FIG. 30).

In some embodiments, such as embodiments using a strand of lights on a home or business, at least some of the clips may be attached to anchor magnets and not attached to anchor assemblies. In certain embodiment such as those hanging a banner, it is effective to put anchor assemblies at a distance of approximately two (2) feet due apart.

In certain embodiments such as those hanging items such as Christmas lights or flags, anchor assemblies may only be required in a few locations. Removing the clips from off of the anchor magnet without the anchor assembly is simple and straightforward. In some embodiments, this requires using the wire hook on the mounting head assembly, pulling down gently and releasing each clip from off its respective magnet one at a time. Doing this slowly prevents the light strand from coming down all at once.

In some embodiments, once all the hooking arms are positioned up and off of the wire and out of the way, a user can remove all the Christmas lights very quickly. In some embodiments, this can be done in less than 10 seconds by pulling down with the wire hook in one quick motion.

In certain embodiments, after the initial installation of the anchor magnets, use of the systems and methods disclosed eliminates the need for use of a ladder.

In some embodiments, the method includes use of a placement guide to ensure the uniform positioning of the anchor assemblies and corresponding uniform positioning of clip assemblies.

In some embodiments, the method includes use of a storage device for storing a strand of lights that has clip assemblies fastened to it. In certain embodiments, the storage device is a board that contains 2.4 lb neodymium magnets embedded in a ½' square. In some embodiments, each side of the board contains 10 squares. The magnetic squares connect to the clip assemblies. Each board can hold 40 feet of a light strand. Boards can be interlocked and hung in a closet or rolled in a bundle for storage. This keeps the lights tangle free and ready for put up next season.

What is claimed is:

1. A hanging and mounting system comprising:
   at least one clip assembly configured to be fastened to an object, the clip assembly comprising:
      a first half having at least two sides, a side that faces substantially opposite the object and a side that faces substantially toward the object, and a connection member attached to the side that faces substantially opposite the object, the connection member being composed at least in part of magnetic material;
      a second half having at least two sides, a side that faces substantially opposite the object and a side that faces substantially toward the object, and a connection member attached to the side that faces substantially opposite the object, the connection member being composed at least in part of magnetic material; and
      at least one fastening member configured to fasten the first half and the second half to the object;
   at least one anchor assembly to be affixed to a structure, the anchor assembly comprising:
      an anchor magnet configured to connect to at least one of the connection members; and
      an affixing member configured to affix the anchor magnet to the structure; and
   a mounting head assembly comprising:
      a mounting head configured to attach to a pole; and
      a mounting-head magnet configured to connect to at least one of the connection members, the mounting-head magnet being attached to the tip of the mounting head.

2. The system of claim 1, wherein the connection members are 0.5"×0.5" galvanized steel plates, the anchor magnet is a N52 neodymium 0.5"×0.5"×0.25" block, and the mounting-head magnet is 9 lb neodymium magnet.

3. The system of claim 2, wherein the first half further comprises:
   four extensions extending from the side of the first half facing substantially toward the object, the extensions arranged such that two of the extensions extend on one side of the object while the other two extensions extend on the opposite side of the object;
   a protrusion extending from the side of the first half facing substantially toward the object, the protrusion running along the center of the side of the first half facing the object;
   a tunnel extending from one side of the protrusion to the other side; and
   a walled-in, open area on the side of the first half facing substantially opposite the object, the connection member being placed at the base of the walled-in, open area.

4. The system of claim 3, wherein the second half further comprises:
   four stabilizing braces extending from the side of the second half facing the object, the stabilizing braces arranged to impede the extensions from moving along the x-y plane;
   a protrusion extending from the side of the second half facing substantially toward the object, the protrusion running along the center of the side of the second half facing the object;
   a tunnel extending from one side of the protrusion to the other side; and a walled-in, open area on the side of the second half facing substantially opposite the object, the connection member being placed at the base of the walled-in, open area.

5. The system of claim 4, wherein the fastening member is a 3" long mini nylon zip tie.

6. The system of claim 5, wherein the affixing member is a #6 screw.

7. The system of claim 5, wherein the affixing member is 3M® double-sided urethane foam tape.

8. The system of claim 6, wherein at least one of the anchor assemblies includes a safety-hook base.

9. The system of claim 6, wherein at least one of the anchor assemblies includes a peak base.

10. A method for mounting objects on a building, wall, or other structure, the method comprising the steps of:
   fastening at least one clip assembly to an object;
   for each clip assembly fastened to the object, affixing an anchor magnet that corresponds with each clip assembly to a building, wall, or other structure, the anchor magnets spaced at the same distances as the clip assemblies are spaced on the object;
   attaching a mounting head assembly to a pole; and
   connecting each clip assembly to the anchor magnet that corresponds to the clip assembly this step comprising:
   connecting a mounting-head magnet to one of the connection members of the clip assembly:
   raising the clip assembly to the anchor magnet;
   placing the connection member not connected to the mounting-head magnet adjacent to the anchor magnet:
   connecting the connection member not connected to the mounting-head magnet to the anchor magnet; pulling the mounting-head magnet away from the dip assembly while the clip assembly remains connected to an anchor assembly;
for a plurality of anchor magnets, in addition to affixing at least one of the plurality of anchor magnets to the building, wall, or other structure, also affixing a safety-hook base, with its hooking arms in an open position, in between the anchor magnet and the building, wall, or other structure; and
after connecting the clip assembly to the anchor assembly that includes a safety-hook base, using the mounting-head magnet to move the hooking arms of the safety-hook base into a safety position.

* * * * *